United States Patent
Grant et al.

(10) Patent No.: US 12,222,499 B2
(45) Date of Patent: Feb. 11, 2025

(54) EYE GLOW SUPPRESSION IN WAVEGUIDE BASED DISPLAYS

(71) Applicant: DigiLens Inc., Sunnyvale, CA (US)

(72) Inventors: Alastair John Grant, San Jose, CA (US); Richard E. Bergstrom, Jr., Hayward, CA (US); Roger Allen Conley Smith, Sunnyvale, CA (US); Michiel Koen Callens, Sunnyvale, CA (US); Nicholas Sherwood, Sunnyvale, CA (US); Nima Shams, Sunnyvale, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 354 days.

(21) Appl. No.: 17/645,212

(22) Filed: Dec. 20, 2021

(65) Prior Publication Data
US 2022/0197026 A1   Jun. 23, 2022

Related U.S. Application Data

(60) Provisional application No. 63/129,270, filed on Dec. 22, 2020, provisional application No. 63/128,645, filed on Dec. 21, 2020.

(51) Int. Cl.
*G02B 27/01* (2006.01)
*F21V 8/00* (2006.01)

(52) U.S. Cl.
CPC ....... *G02B 27/0101* (2013.01); *G02B 6/0036* (2013.01); *G02B 2027/0118* (2013.01)

(58) Field of Classification Search
CPC .. G02B 27/0172; G02B 27/0101; G02B 6/34; G02B 6/0036; G02B 2027/0178; G02B 2027/0118
See application file for complete search history.

(56) References Cited

U.S. PATENT DOCUMENTS 1,043,938 A   11/1912   Huttenlocher
3,482,498 A   12/1969   Becker
(Continued)

FOREIGN PATENT DOCUMENTS

BR   PI0720469 A2   1/2014
CA   2889727 A1   6/2014
(Continued)

OTHER PUBLICATIONS

JP 2015504616 A (English Translation) (Year: 2015).*
(Continued)

*Primary Examiner* — Balram T Parbadia
*Assistant Examiner* — Mary A El-Shammaa
(74) *Attorney, Agent, or Firm* — KPPB LLP

(57) ABSTRACT

Methods and apparatus for eye-glow suppression in waveguide systems is disclosed herein. Some embodiments of the methods and the apparatus include a source of image modulated light; a waveguide having an eye-facing surface and an external surface facing the outside world; an input coupler for coupling the light into a total reflection internal path in the waveguide; at least one grating for providing beam expansion and extracting light from the waveguide towards an eyebox; a polymer grating structure comprising a modulation depth and a grating pitch. The modulation depth is greater than the grating pitch across at least a portion of the polymer grating structure. Advantageously, the polymer grating structure is configured to diffract light entering the waveguide from the outside world or stray light generated within the waveguide away from optical paths that are refracted through the external surface into the outside world.

23 Claims, 15 Drawing Sheets

(56) References Cited

U.S. PATENT DOCUMENTS

| | | |
|---|---|---|
| 3,741,716 A | 6/1973 | Johne et al. |
| 3,843,231 A | 10/1974 | Borel et al. |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,248,093 A | 2/1981 | Andersson et al. |
| 4,251,137 A | 2/1981 | Knop et al. |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,688,900 A | 8/1987 | Doane et al. |
| 4,711,512 A | 12/1987 | Upatnieks |
| 4,728,547 A | 3/1988 | Vaz et al. |
| 4,729,640 A | 3/1988 | Sakata et al. |
| 4,765,703 A | 8/1988 | Suzuki et al. |
| 4,791,788 A | 12/1988 | Simmonds et al. |
| 4,792,850 A | 12/1988 | Liptoh et al. |
| 4,811,414 A | 3/1989 | Fishbine et al. |
| 4,848,093 A | 7/1989 | Simmonds et al. |
| 4,884,876 A | 12/1989 | Lipton et al. |
| 4,890,902 A | 1/1990 | Doane et al. |
| 4,933,976 A | 6/1990 | Fishbine et al. |
| 4,938,568 A | 7/1990 | Margerum et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,009,483 A | 4/1991 | Rockwell et al. |
| 5,033,814 A | 7/1991 | Brown et al. |
| 5,053,834 A | 10/1991 | Simmonds |
| 5,063,441 A | 11/1991 | Lipton et al. |
| 5,096,282 A | 3/1992 | Margerum et al. |
| 5,099,343 A | 3/1992 | Margerum et al. |
| 5,110,034 A | 5/1992 | Simmonds et al. |
| 5,117,302 A | 5/1992 | Lipton |
| 5,119,454 A | 6/1992 | McMahon et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,181,133 A | 1/1993 | Lipton |
| 5,193,000 A | 3/1993 | Lipton et al. |
| 5,198,912 A | 3/1993 | Ingwall et al. |
| 5,200,861 A | 4/1993 | Moskovich et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,295,208 A | 3/1994 | Caulfield et al. |
| 5,296,967 A | 3/1994 | Moskovich et al. |
| 5,299,289 A | 3/1994 | Omae et al. |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,327,269 A | 7/1994 | Tilton et al. |
| 5,329,363 A | 7/1994 | Moskovich et al. |
| 5,343,147 A | 8/1994 | Sager et al. |
| 5,368,770 A | 11/1994 | Saupe et al. |
| 5,371,626 A | 12/1994 | Betensky |
| 5,416,510 A | 5/1995 | Lipton et al. |
| 5,418,871 A | 5/1995 | Revelli et al. |
| 5,428,480 A | 6/1995 | Betensky et al. |
| 5,437,811 A | 8/1995 | Doane et al. |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |
| 5,465,311 A | 11/1995 | Caulfield et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,499,140 A | 3/1996 | Betensky |
| 5,500,769 A | 3/1996 | Betensky |
| 5,515,184 A | 5/1996 | Caulfield et al. |
| 5,516,455 A | 5/1996 | Jacobine et al. |
| 5,530,566 A | 6/1996 | Kumar |
| 5,532,875 A | 7/1996 | Betemsky |
| RE35,310 E | 8/1996 | Moskovich |
| 5,543,950 A | 8/1996 | Lavrentovich et al. |
| 5,559,637 A | 9/1996 | Moskovich et al. |
| 5,572,250 A | 11/1996 | Lipton et al. |
| 5,576,888 A | 11/1996 | Betensky |
| 5,585,035 A | 12/1996 | Nerad et al. |
| 5,593,615 A | 1/1997 | Nerad et al. |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,668,614 A | 9/1997 | Chien et al. |
| 5,677,797 A | 10/1997 | Betensky et al. |
| 5,680,231 A | 10/1997 | Grinberg et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,695,682 A | 12/1997 | Doane et al. |
| 5,706,136 A | 1/1998 | Okuyama et al. |
| 5,710,645 A | 1/1998 | Phillips et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,790,314 A | 8/1998 | Duck et al. |
| 5,798,641 A | 8/1998 | Spagna et al. |
| 5,808,804 A | 9/1998 | Moskovich |
| 5,822,089 A | 10/1998 | Phillips et al. |
| 5,825,448 A | 10/1998 | Bos et al. |
| 5,831,700 A | 11/1998 | Li et al. |
| 5,835,661 A | 11/1998 | Tai et al. |
| 5,841,587 A | 11/1998 | Moskovich et al. |
| 5,856,842 A | 1/1999 | Tedesco |
| 5,867,238 A | 2/1999 | Miller et al. |
| 5,870,228 A | 2/1999 | Kreitzer et al. |
| 5,875,012 A | 2/1999 | Crawford et al. |
| 5,877,826 A | 3/1999 | Yang et al. |
| 5,892,599 A | 4/1999 | Bahuguna |
| 5,900,987 A | 5/1999 | Kreitzer et al. |
| 5,900,989 A | 5/1999 | Kreitzer |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,949,508 A | 9/1999 | Kumar et al. |
| 5,956,113 A | 9/1999 | Crawford |
| 5,963,375 A | 10/1999 | Kreitzer |
| 5,966,223 A | 10/1999 | Friesem et al. |
| 5,969,874 A | 10/1999 | Moskovich |

(56) References Cited

U.S. PATENT DOCUMENTS

| | | |
|---|---|---|
| 5,969,876 A | 10/1999 | Kreitzer et al. |
| 5,973,727 A | 10/1999 | McGrew et al. |
| 5,974,162 A | 10/1999 | Metz et al. |
| 5,986,746 A | 11/1999 | Metz et al. |
| 5,999,089 A | 12/1999 | Carlson et al. |
| 5,999,282 A | 12/1999 | Suzuki et al. |
| 6,014,187 A | 1/2000 | Taketomi et al. |
| 6,023,375 A | 2/2000 | Kreitzer |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,094,311 A | 7/2000 | Moskovich |
| 6,097,551 A | 8/2000 | Kreitzer |
| 6,104,448 A | 8/2000 | Doane et al. |
| 6,115,152 A | 9/2000 | Popovich et al. |
| 6,128,058 A | 10/2000 | Walton et al. |
| 6,133,971 A | 10/2000 | Silverstein et al. |
| 6,133,975 A | 10/2000 | Li et al. |
| 6,141,074 A | 10/2000 | Bos et al. |
| 6,141,154 A | 10/2000 | Kreitzer et al. |
| 6,151,142 A | 11/2000 | Phillips et al. |
| 6,154,190 A | 11/2000 | Yang et al. |
| 6,169,594 B1 | 1/2001 | Aye et al. |
| 6,169,613 B1 | 1/2001 | Amitai et al. |
| 6,169,636 B1 | 1/2001 | Kreitzer et al. |
| 6,188,462 B1 | 2/2001 | Lavrentovich et al. |
| 6,191,887 B1 | 2/2001 | Michaloski et al. |
| 6,195,209 B1 | 2/2001 | Kreitzer et al. |
| 6,204,835 B1 | 3/2001 | Yang et al. |
| 6,211,976 B1 | 4/2001 | Popovich et al. |
| 6,268,839 B1 | 7/2001 | Yang et al. |
| 6,269,203 B1 | 7/2001 | Davies et al. |
| 6,275,031 B1 | 8/2001 | Simmonds et al. |
| 6,278,429 B1 | 8/2001 | Ruth et al. |
| 6,297,860 B1 | 10/2001 | Moskovich et al. |
| 6,301,056 B1 | 10/2001 | Kreitzer et al. |
| 6,301,057 B1 | 10/2001 | Kreitzer et al. |
| 6,317,228 B2 | 11/2001 | Popovich et al. |
| 6,320,563 B1 | 11/2001 | Yang et al. |
| 6,324,014 B1 | 11/2001 | Moskovich et al. |
| 6,330,109 B1 | 12/2001 | Ishii et al. |
| 6,366,281 B1 | 4/2002 | Lipton et al. |
| 6,377,238 B1 | 4/2002 | McPheters |
| 6,377,321 B1 | 4/2002 | Khan et al. |
| 6,388,797 B1 | 5/2002 | Lipton et al. |
| 6,411,444 B1 | 6/2002 | Moskovich et al. |
| 6,414,760 B1 | 7/2002 | Lopez et al. |
| 6,417,971 B1 | 7/2002 | Moskovich et al. |
| 6,437,563 B1 | 8/2002 | Simmonds et al. |
| 6,445,512 B1 | 9/2002 | Moskovich et al. |
| 6,476,974 B1 | 11/2002 | Kreitzer et al. |
| 6,483,303 B2 | 11/2002 | Simmonds et al. |
| 6,504,629 B1 | 1/2003 | Popovich et al. |
| 6,509,937 B1 | 1/2003 | Moskovich et al. |
| 6,518,747 B2 | 2/2003 | Sager et al. |
| 6,519,088 B1 | 2/2003 | Lipton |
| 6,529,336 B1 | 3/2003 | Kreitzer et al. |
| 6,559,813 B1 | 5/2003 | DeLuca et al. |
| 6,563,648 B2 | 5/2003 | Gleckman et al. |
| 6,563,650 B2 | 5/2003 | Moskovich et al. |
| 6,567,573 B1 | 5/2003 | Domash et al. |
| 6,577,411 B1 | 6/2003 | David et al. |
| 6,577,429 B1 | 6/2003 | Kurtz et al. |
| 6,580,529 B1 | 6/2003 | Amitai et al. |
| 6,583,838 B1 | 6/2003 | Hoke et al. |
| 6,594,090 B2 | 7/2003 | Kruschwitz et al. |
| 6,597,176 B2 | 7/2003 | Simmonds et al. |
| 6,597,475 B1 | 7/2003 | Shirakura et al. |
| 6,600,590 B2 | 7/2003 | Roddy et al. |
| 6,618,104 B1 | 9/2003 | Date et al. |
| 6,625,381 B2 | 9/2003 | Roddy et al. |
| 6,646,772 B1 | 11/2003 | Popovich et al. |
| 6,667,134 B1 | 12/2003 | Sutherland et al. |
| 6,677,086 B1 | 1/2004 | Sutehrland et al. |
| 6,692,666 B2 | 2/2004 | Sutherland et al. |
| 6,699,407 B1 | 3/2004 | Sutehrland et al. |
| 6,706,086 B2 | 3/2004 | Emig et al. |
| 6,706,451 B1 | 3/2004 | Sutherland et al. |
| 6,730,442 B1 | 5/2004 | Sutherland et al. |
| 6,731,434 B1 | 5/2004 | Hua et al. |
| 6,738,105 B1 | 5/2004 | Hannah et al. |
| 6,747,781 B2 | 6/2004 | Trisnadi et al. |
| 6,791,629 B2 | 9/2004 | Moskovich et al. |
| 6,791,739 B2 | 9/2004 | Ramanujan et al. |
| 6,804,066 B1 | 10/2004 | Ha et al. |
| 6,805,490 B2 | 10/2004 | Levola |
| 6,821,457 B1 | 11/2004 | Natarajan et al. |
| 6,822,713 B1 | 11/2004 | Yaroshchuk et al. |
| 6,825,987 B2 | 11/2004 | Repetto et al. |
| 6,829,095 B2 | 12/2004 | Amitai |
| 6,830,789 B2 | 12/2004 | Doane et al. |
| 6,833,955 B2 | 12/2004 | Niv |
| 6,847,488 B2 | 1/2005 | Travis |
| 6,850,210 B1 | 2/2005 | Lipton et al. |
| 6,853,493 B2 | 2/2005 | Kreitzer et al. |
| 6,867,888 B2 | 3/2005 | Sutherland et al. |
| 6,878,494 B2 | 4/2005 | Sutehrland et al. |
| 6,927,570 B2 | 8/2005 | Simmonds et al. |
| 6,927,694 B1 | 8/2005 | Smith et al. |
| 6,950,173 B1 | 9/2005 | Sutherland et al. |
| 6,952,435 B2 | 10/2005 | Lai et al. |
| 6,958,868 B1 | 10/2005 | Pender |
| 6,963,454 B1 | 11/2005 | Martins et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,019,793 B2 | 3/2006 | Moskovich et al. |
| 7,021,777 B2 | 4/2006 | Amitai |
| 7,026,892 B2 | 4/2006 | Kajiya |
| 7,054,045 B2 | 5/2006 | McPheters et al. |
| 7,068,405 B2 | 6/2006 | Sutherland et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,099,080 B2 | 8/2006 | Lipton et al. |
| 7,108,383 B1 | 9/2006 | Mitchell et al. |
| 7,119,965 B1 | 10/2006 | Rolland et al. |
| 7,123,421 B1 | 10/2006 | Moskovich et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,167,286 B2 | 1/2007 | Anderson et al. |
| 7,175,780 B1 | 2/2007 | Sutherland et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,198,737 B2 | 4/2007 | Natarajan et al. |
| 7,206,107 B2 | 4/2007 | Levola |
| 7,230,770 B2 | 6/2007 | Kreitzer et al. |
| 7,256,915 B2 | 8/2007 | Sutherland et al. |
| 7,265,882 B2 | 9/2007 | Sutherland et al. |
| 7,265,903 B2 | 9/2007 | Sutherland et al. |
| RE39,911 E | 11/2007 | Moskovich |
| 7,301,601 B2 | 11/2007 | Lin et al. |
| 7,312,906 B2 | 12/2007 | Sutherland et al. |
| 7,333,685 B2 | 2/2008 | Stone et al. |
| 7,375,886 B2 | 5/2008 | Lipton et al. |
| 7,391,573 B2 | 6/2008 | Amitai |
| 7,413,678 B1 | 8/2008 | Natarajan et al. |
| 7,413,679 B1 | 8/2008 | Sutherland et al. |
| 7,416,818 B2 | 8/2008 | Sutherland et al. |

(56) References Cited

U.S. PATENT DOCUMENTS

| | | |
|---|---|---|
| 7,418,170 B2 | 8/2008 | Mukawa et al. |
| 7,420,733 B1 | 9/2008 | Natarajan et al. |
| 7,453,612 B2 | 11/2008 | Mukawa |
| 7,454,103 B2 | 11/2008 | Parriaux |
| 7,457,040 B2 | 11/2008 | Amitai |
| 7,477,206 B2 | 1/2009 | Cowan et al. |
| 7,499,217 B2 | 3/2009 | Cakmakci et al. |
| 7,511,891 B2 | 3/2009 | Messerschmidt |
| 7,522,344 B1 | 4/2009 | Curatu et al. |
| 7,570,322 B1 | 8/2009 | Sutherland et al. |
| 7,570,405 B1 | 8/2009 | Sutherland et al. |
| 7,577,326 B2 | 8/2009 | Amitai |
| 7,583,423 B2 | 9/2009 | Sutherland et al. |
| 7,589,901 B2 | 9/2009 | DeJong et al. |
| 7,605,882 B1 | 10/2009 | Sutherland et al. |
| 7,619,739 B1 | 11/2009 | Sutherland et al. |
| 7,639,208 B1 | 12/2009 | Ha et al. |
| 7,643,214 B2 | 1/2010 | Amitai |
| 7,672,055 B2 | 3/2010 | Amitai |
| 7,672,549 B2 | 3/2010 | Ghosh et al. |
| 7,710,622 B2 | 5/2010 | Takabayashi et al. |
| 7,724,443 B2 | 5/2010 | Amitai |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,843,642 B2 | 11/2010 | Shaoulov et al. |
| 7,866,869 B2 | 1/2011 | Karakawa |
| 7,872,707 B1 | 1/2011 | Sutherland et al. |
| 7,884,593 B2 | 2/2011 | Simmonds et al. |
| 7,884,985 B2 | 2/2011 | Amitai et al. |
| 7,907,342 B2 | 3/2011 | Simmonds et al. |
| 7,936,519 B2 | 5/2011 | Mukawa et al. |
| 7,944,616 B2 | 5/2011 | Mukawa |
| 7,949,214 B2 | 5/2011 | DeJong et al. |
| 7,969,657 B2 | 6/2011 | Cakmakci et al. |
| 8,000,020 B2 | 8/2011 | Amitai et al. |
| 8,014,050 B2 | 9/2011 | McGrew |
| 8,016,475 B2 | 9/2011 | Travis |
| 8,018,579 B1 | 9/2011 | Krah |
| 8,023,783 B2 | 9/2011 | Mukawa et al. |
| 8,073,296 B2 | 12/2011 | Mukawa et al. |
| 8,077,274 B2 | 12/2011 | Sutherland et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,134,434 B2 | 3/2012 | Diederichs et al. |
| 8,142,016 B2 | 3/2012 | Legerton et al. |
| 8,155,489 B2 | 4/2012 | Saarikko et al. |
| 8,160,411 B2 | 4/2012 | Levola et al. |
| 8,167,173 B1 | 5/2012 | Simmonds et al. |
| 8,194,325 B2 | 6/2012 | Levola et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,294,749 B2 | 10/2012 | Cable |
| 8,310,327 B2 | 11/2012 | Willers et al. |
| 8,314,993 B2 | 11/2012 | Levola et al. |
| 8,320,032 B2 | 11/2012 | Levola |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,396,339 B2 | 3/2013 | Mukawa et al. |
| 8,422,840 B2 | 4/2013 | Large |
| 8,432,614 B2 | 4/2013 | Amitai |
| 8,441,731 B2 | 5/2013 | Sprague |
| 8,466,953 B2 | 6/2013 | Levola |
| 8,472,120 B2 | 6/2013 | Border et al. |
| 8,481,130 B2 | 7/2013 | Harding et al. |
| 8,482,858 B2 | 7/2013 | Sprague |
| 8,488,246 B2 | 7/2013 | Border et al. |
| 8,491,136 B2 | 7/2013 | Travis et al. |
| 8,493,662 B2 | 7/2013 | Noui |
| 8,494,229 B2 | 7/2013 | Jarvenpaa et al. |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,582,206 B2 | 11/2013 | Travis |
| 8,593,734 B2 | 11/2013 | Laakkonen |
| 8,611,014 B2 | 12/2013 | Valera et al. |
| 8,634,120 B2 | 1/2014 | Popovich et al. |
| 8,639,072 B2 | 1/2014 | Popovich et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,698,705 B2 | 4/2014 | Burke |
| 8,731,350 B1 | 5/2014 | Lin et al. |
| 8,736,963 B2 | 5/2014 | Robbins et al. |
| 8,746,008 B1 | 6/2014 | Mauritsen et al. |
| 8,786,923 B2 | 7/2014 | Chuang et al. |
| 8,810,913 B2 | 8/2014 | Simmonds et al. |
| 8,810,914 B2 | 8/2014 | Amitai |
| 8,817,350 B1 | 8/2014 | Robbins et al. |
| 8,824,836 B2 | 9/2014 | Sugiyama |
| 8,830,584 B2 | 9/2014 | Saarikko et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,865 B1 | 12/2014 | Bennett |
| 8,917,453 B2 | 12/2014 | Bohn |
| 8,937,771 B2 | 1/2015 | Robbins et al. |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,201,270 B2 | 12/2015 | Fattal et al. |
| 9,215,293 B2 | 12/2015 | Miller |
| 9,269,854 B2 | 2/2016 | Jain |
| 9,274,338 B2 | 3/2016 | Robbins et al. |
| 9,310,566 B2 | 4/2016 | Valera et al. |
| 9,329,325 B2 | 5/2016 | Simmonds et al. |
| 9,341,846 B2 | 5/2016 | Popovich et al. |
| 9,354,366 B2 | 5/2016 | Jain |
| 9,366,862 B2 | 6/2016 | Haddick et al. |
| 9,372,347 B1 | 6/2016 | Levola et al. |
| 9,377,623 B2 | 6/2016 | Robbins et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,431,794 B2 | 8/2016 | Jain |
| 9,459,451 B2 | 10/2016 | Saarikko et al. |
| 9,465,213 B2 | 10/2016 | Simmonds |
| 9,494,799 B2 | 11/2016 | Robbins et al. |
| 9,541,383 B2 | 1/2017 | Abovitz et al. |

(56) References Cited

U.S. PATENT DOCUMENTS

| | | |
|---|---|---|
| 9,547,174 B2 | 1/2017 | Gao et al. |
| 9,551,874 B2 | 1/2017 | Amitai |
| 9,551,880 B2 | 1/2017 | Amitai |
| 9,612,403 B2 | 4/2017 | Abovitz et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,727,772 B2 | 8/2017 | Popovich et al. |
| 9,746,688 B2 | 8/2017 | Popovich et al. |
| 9,799,853 B2 | 10/2017 | Lamansky et al. |
| 9,864,208 B2 | 1/2018 | Vallius et al. |
| 10,234,686 B2 | 3/2019 | Vallius |
| 10,241,332 B2 * | 3/2019 | Vallius .................... G02B 6/34 |
| 10,569,449 B1 | 2/2020 | Curts et al. |
| 10,578,876 B1 | 3/2020 | Lam et al. |
| 10,598,938 B1 | 3/2020 | Huang et al. |
| 10,613,268 B1 | 4/2020 | Colburn et al. |
| 10,649,119 B2 | 5/2020 | Mohanty et al. |
| 10,690,831 B2 | 6/2020 | Calafiore |
| 10,690,851 B2 | 6/2020 | Waldern et al. |
| 10,732,351 B2 | 8/2020 | Colburn et al. |
| 10,823,887 B1 | 11/2020 | Calafiore et al. |
| 10,845,596 B2 | 11/2020 | Lee et al. |
| 10,983,257 B1 | 4/2021 | Colburn et al. |
| 11,103,892 B1 | 8/2021 | Liao et al. |
| 11,107,972 B2 | 8/2021 | Diest et al. |
| 11,137,603 B2 | 10/2021 | Zhang |
| 11,243,333 B1 | 2/2022 | Ouderkirk et al. |
| 11,306,193 B1 | 4/2022 | Lane et al. |
| 11,307,357 B2 | 4/2022 | Mohanty |
| 11,340,386 B1 | 5/2022 | Ouderkirk et al. |
| 11,391,950 B2 | 7/2022 | Calafiore |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0036825 A1 | 3/2002 | Lipton et al. |
| 2002/0047837 A1 | 4/2002 | Suyama et al. |
| 2002/0110077 A1 | 8/2002 | Drobot et al. |
| 2002/0126332 A1 | 9/2002 | Popovich |
| 2002/0196332 A1 | 12/2002 | Lipton et al. |
| 2003/0007070 A1 | 1/2003 | Lipton et al. |
| 2003/0038912 A1 | 2/2003 | Broer et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0197157 A1 | 10/2003 | Sutherland et al. |
| 2003/0202247 A1 | 10/2003 | Niv et al. |
| 2004/0004767 A1 | 1/2004 | Song |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0141217 A1 | 7/2004 | Endo et al. |
| 2004/0175627 A1 | 9/2004 | Sutherland et al. |
| 2004/0179764 A1 | 9/2004 | Melikechi et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0141066 A1 | 6/2005 | Ouchi |
| 2005/0180687 A1 | 8/2005 | Amitai |
| 2005/0195276 A1 | 9/2005 | Lipton et al. |
| 2005/0232530 A1 | 10/2005 | Kekas |
| 2005/0265585 A1 | 12/2005 | Rowe |
| 2005/0271258 A1 | 12/2005 | Rowe |
| 2005/0286133 A1 | 12/2005 | Lipton |
| 2006/0012878 A1 | 1/2006 | Lipton et al. |
| 2006/0043938 A1 | 3/2006 | O'Gorman et al. |
| 2006/0119837 A1 | 6/2006 | Raguin et al. |
| 2006/0132914 A1 | 6/2006 | Weiss et al. |
| 2006/0146422 A1 | 7/2006 | Koike |
| 2006/0171647 A1 | 8/2006 | Ye et al. |
| 2006/0191293 A1 | 8/2006 | Kuczma |
| 2006/0215244 A1 | 9/2006 | Yosha et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0284974 A1 | 12/2006 | Lipton et al. |
| 2006/0285205 A1 | 12/2006 | Lipton et al. |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0041684 A1 | 2/2007 | Popovich et al. |
| 2007/0070476 A1 | 3/2007 | Yamada et al. |
| 2007/0097502 A1 | 5/2007 | Lipton et al. |
| 2007/0109401 A1 | 5/2007 | Lipton et al. |
| 2007/0133089 A1 | 6/2007 | Lipton et al. |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0183650 A1 | 8/2007 | Lipton et al. |
| 2007/0188602 A1 | 8/2007 | Cowan et al. |
| 2007/0206155 A1 | 9/2007 | Lipton |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0186573 A1 | 8/2008 | Lipton |
| 2008/0186574 A1 | 8/2008 | Robinson et al. |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0251772 A1 | 10/2008 | Rohlfing et al. |
| 2008/0273081 A1 | 11/2008 | Lipton |
| 2008/0285137 A1 | 11/2008 | Simmonds et al. |
| 2008/0297731 A1 | 12/2008 | Powell et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0316303 A1 | 12/2008 | Chiu et al. |
| 2008/0316375 A1 | 12/2008 | Lipton et al. |
| 2009/0052047 A1 | 2/2009 | Amitai |
| 2009/0074356 A1 | 3/2009 | Sanchez et al. |
| 2009/0128495 A1 | 5/2009 | Kong et al. |
| 2009/0128911 A1 | 5/2009 | Itzkovitch et al. |
| 2009/0141324 A1 | 6/2009 | Mukawa |
| 2009/0190222 A1 | 7/2009 | Simmonds et al. |
| 2009/0242021 A1 | 10/2009 | Petkie et al. |
| 2009/0296218 A1 | 12/2009 | Ryytty |
| 2009/0303599 A1 | 12/2009 | Levola |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0079865 A1 | 4/2010 | Saarikko et al. |
| 2010/0086256 A1 | 4/2010 | Ben Bakir et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0149073 A1 | 6/2010 | Chaum et al. |
| 2010/0220293 A1 | 9/2010 | Mizushima et al. |
| 2010/0231532 A1 | 9/2010 | Nho et al. |
| 2010/0246003 A1 | 9/2010 | Simmonds et al. |
| 2010/0246004 A1 | 9/2010 | Simmonds |

(56) References Cited

U.S. PATENT DOCUMENTS

| | | |
|---|---|---|
| 2010/0284085 A1 | 11/2010 | Laakkonen |
| 2010/0284090 A1 | 11/2010 | Simmonds |
| 2010/0284180 A1 | 11/2010 | Popovich et al. |
| 2010/0321781 A1 | 12/2010 | Levola et al. |
| 2011/0019874 A1 | 1/2011 | Jarvenpaa et al. |
| 2011/0026128 A1 | 2/2011 | Baker et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0063604 A1 | 3/2011 | Hamre et al. |
| 2011/0102711 A1 | 5/2011 | Sutherland et al. |
| 2011/0109880 A1 | 5/2011 | Nummela |
| 2011/0187293 A1 | 8/2011 | Travis et al. |
| 2011/0235179 A1 | 9/2011 | Simmonds |
| 2011/0236803 A1 | 9/2011 | Weiser et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0120493 A1 | 5/2012 | Simmonds et al. |
| 2012/0162549 A1 | 6/2012 | Gao et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large |
| 2012/0214089 A1 | 8/2012 | Hönel et al. |
| 2012/0214090 A1 | 8/2012 | Weiser et al. |
| 2012/0235886 A1 | 9/2012 | Border et al. |
| 2012/0290973 A1 | 11/2012 | Robertson et al. |
| 2012/0300311 A1 | 11/2012 | Simmonds et al. |
| 2013/0016324 A1 | 1/2013 | Travis |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0143336 A1 | 6/2013 | Jain |
| 2013/0163089 A1 | 6/2013 | Bohn |
| 2013/0176704 A1 | 7/2013 | Lanman et al. |
| 2013/0182322 A1 | 7/2013 | Silverstein |
| 2013/0207887 A1 | 8/2013 | Raffle et al. |
| 2013/0224634 A1 | 8/2013 | Berneth et al. |
| 2013/0229717 A1 | 9/2013 | Amitai |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0322810 A1 | 12/2013 | Robbins |
| 2013/0342525 A1 | 12/2013 | Benko et al. |
| 2014/0003762 A1 | 1/2014 | Macnamara |
| 2014/0024159 A1 | 1/2014 | Jain |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0160576 A1 | 6/2014 | Robbins et al. |
| 2014/0168735 A1 | 6/2014 | Yuan et al. |
| 2014/0168783 A1 | 6/2014 | Luebke et al. |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0125109 A1 | 5/2015 | Robbins et al. |
| 2015/0148728 A1 | 5/2015 | Sallum et al. |
| 2015/0185475 A1 | 7/2015 | Saarikko et al. |
| 2015/0235447 A1 | 8/2015 | Abovitz et al. |
| 2015/0235448 A1 | 8/2015 | Schowengerdt et al. |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0288129 A1 | 10/2015 | Jain |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0195664 A1 | 7/2016 | Fattal et al. |
| 2016/0209648 A1 | 7/2016 | Haddick et al. |
| 2016/0231568 A1 | 8/2016 | Saarikko et al. |
| 2016/0266398 A1 | 9/2016 | Poon et al. |
| 2016/0274362 A1 | 9/2016 | Tinch et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0341964 A1 | 11/2016 | Amitai |
| 2017/0003505 A1 | 1/2017 | Vallius et al. |
| 2017/0010488 A1 | 1/2017 | Klug et al. |
| 2017/0030550 A1 | 2/2017 | Popovich et al. |
| 2017/0031171 A1 | 2/2017 | Vallius et al. |

(56) References Cited

U.S. PATENT DOCUMENTS

| | | | |
|---|---|---|---|
| 2017/0034435 | A1 | 2/2017 | Vallius |
| 2017/0038579 | A1 | 2/2017 | Yeoh et al. |
| 2017/0052376 | A1 | 2/2017 | Amitai et al. |
| 2017/0059759 | A1 | 3/2017 | Ayres et al. |
| 2017/0102543 | A1 | 4/2017 | Vallius |
| 2017/0115487 | A1 | 4/2017 | Travis et al. |
| 2017/0123208 | A1 | 5/2017 | Vallius |
| 2017/0131460 | A1 | 5/2017 | Lin et al. |
| 2017/0131546 | A1 | 5/2017 | Woltman et al. |
| 2017/0131551 | A1 | 5/2017 | Robbins et al. |
| 2017/0180404 | A1 | 6/2017 | Bersch et al. |
| 2017/0180408 | A1 | 6/2017 | Yu et al. |
| 2017/0219841 | A1 | 8/2017 | Popovich et al. |
| 2017/0299860 | A1 | 10/2017 | Wall et al. |
| 2018/0284440 | A1 | 10/2018 | Popovich et al. |
| 2019/0121126 | A1 | 4/2019 | Simmonds |
| 2020/0026074 | A1 | 1/2020 | Waldern et al. |
| 2020/0033604 | A1 | 1/2020 | Schmulen et al. |
| 2020/0041791 | A1* | 2/2020 | Shipton ............... G02B 27/0172 |
| 2020/0096768 | A1 | 3/2020 | Border et al. |
| 2020/0247016 | A1 | 8/2020 | Calafiore |
| 2020/0249568 | A1 | 8/2020 | Rao et al. |
| 2021/0063634 | A1* | 3/2021 | Waldern ............... G02B 6/02076 |
| 2021/0109285 | A1 | 4/2021 | Jiang et al. |
| 2021/0191122 | A1 | 6/2021 | Yaroshchuk et al. |
| 2021/0199873 | A1 | 7/2021 | Shi et al. |
| 2021/0199971 | A1 | 7/2021 | Lee et al. |
| 2021/0238374 | A1 | 8/2021 | Ye et al. |
| 2022/0019015 | A1 | 1/2022 | Calafiore et al. |
| 2022/0082739 | A1 | 3/2022 | Franke et al. |
| 2022/0091323 | A1 | 3/2022 | Yaroshchuk et al. |
| 2022/0204790 | A1 | 6/2022 | Zhang et al. |
| 2022/0206232 | A1 | 6/2022 | Zhang et al. |
| 2023/0213767 | A1 | 7/2023 | Grant et al. |

FOREIGN PATENT DOCUMENTS

| | | |
|---|---|---|
| CN | 101103297 A | 1/2008 |
| CN | 100492099 C | 5/2009 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| DE | 19751190 A1 | 5/1999 |
| DE | 102012108424 A1 | 3/2014 |
| EP | 0795775 A2 | 9/1997 |
| EP | 1413972 A1 | 4/2004 |
| EP | 1526709 A2 | 4/2005 |
| EP | 1748305 A1 | 1/2007 |
| EP | 1413972 B1 | 10/2008 |
| EP | 2110701 A1 | 10/2009 |
| EP | 2244114 A1 | 10/2010 |
| EP | 2326983 A1 | 6/2011 |
| EP | 1828832 B1 | 5/2013 |
| EP | 2733517 A1 | 5/2014 |
| EP | 1573369 B1 | 7/2014 |
| EP | 2929378 A1 | 10/2015 |
| EP | 2748670 B1 | 11/2015 |
| EP | 2995986 A1 | 3/2016 |
| EP | 4252048 A1 | 10/2023 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | 11109320 A | 4/1999 |
| JP | 11142806 A | 5/1999 |
| JP | 2953444 B2 | 9/1999 |
| JP | 2000056259 A | 2/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2003066428 A | 3/2003 |
| JP | 2003270419 A | 9/2003 |
| JP | 2008112187 A | 5/2008 |
| JP | 2009036955 A | 2/2009 |
| JP | 2009211091 A | 9/2009 |
| JP | 4367775 B2 | 11/2009 |
| JP | 2012137616 A | 7/2012 |
| JP | 5303928 B2 | 10/2013 |
| JP | 2015504616 A * | 2/2015 |
| KR | 20100092059 A | 8/2010 |
| KR | 20140140063 A | 12/2014 |
| KR | 20140142337 A | 12/2014 |
| KR | 20230119015 A | 8/2023 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 2000016136 A1 | 3/2000 |
| WO | 2000023830 | 4/2000 |
| WO | 2000023847 | 4/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2009013597 A2 | 1/2009 |
| WO | 2009077802 A1 | 6/2009 |
| WO | 2009077803 A1 | 6/2009 |
| WO | 2009101238 A1 | 8/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010078856 A1 | 7/2010 |
| WO | 2010104692 A2 | 9/2010 |

(56) References Cited

FOREIGN PATENT DOCUMENTS

| | | |
|---|---|---|
| WO | 2010122330 A1 | 10/2010 |
| WO | 2010125337 A2 | 11/2010 |
| WO | 2011032005 A2 | 3/2011 |
| WO | 2011042711 A2 | 4/2011 |
| WO | 2011051660 A1 | 5/2011 |
| WO | 2011055109 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013034879 A1 | 3/2013 |
| WO | 2013049012 A1 | 4/2013 |
| WO | 2013102759 A2 | 7/2013 |
| WO | 2013167864 A1 | 11/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016046514 A1 | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016118107 A1 | 7/2016 |
| WO | 2016122679 A1 | 8/2016 |
| WO | 2016181108 A1 | 11/2016 |
| WO | 2017060665 A1 | 4/2017 |
| WO | 2017162999 A1 | 9/2017 |
| WO | 2017180403 A1 | 10/2017 |
| WO | 2017182771 A1 | 10/2017 |
| WO | 2017203200 A1 | 11/2017 |
| WO | 2017203201 A1 | 11/2017 |
| WO | 2017207987 A1 | 12/2017 |
| WO | 2018096359 A3 | 7/2018 |
| WO | 2018150163 A1 | 8/2018 |
| WO | 2019077307 A1 | 4/2019 |
| WO | 2019122806 A1 | 6/2019 |
| WO | 2019171038 A1 | 9/2019 |
| WO | 2020212682 A1 | 10/2020 |
| WO | 2021032982 A1 | 2/2021 |
| WO | 2021032983 A1 | 2/2021 |
| WO | 2021041949 A1 | 3/2021 |
| WO | 2021044121 A1 | 3/2021 |
| WO | 2021242898 A1 | 12/2021 |
| WO | 2022015878 A1 | 1/2022 |
| WO | 2022140763 A1 | 6/2022 |

OTHER PUBLICATIONS

Kato et al., "Alignment-Controlled Holographic Polymer Dispersed Liquid Crystal (HPDLC) for Reflective Display Devices", SPIE, 1998, vol. 3297, pp. 52-57.

Kessler, "Optics of Near to Eye Displays (NEDs)", Oasis 2013, Tel Aviv, Feb. 19, 2013, 37 pgs.

Keuper et al., "26.1: RGB LED Illuminator for Pocket-Sized Projectors", SID 04 Digest, 2004, ISSN/0004-0966X/04/3502, pp. 943-945.

Keuper et al., "p. 126: Ultra-Compact LED based Image Projector for Portable Applications", SID 03 Digest, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.

Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.

Kim et al., "Fabrication of Reflective Holographic PDLC for Blue", Molecular Crystals and Liquid Crystals Science, 2001, vol. 368, pp. 3845-3853.

Kim et al., "Optimization of Holographic PDLC for Green", Mol. Cryst. Liq. Cryst., vol. 368, 2001, pp. 3855-3864.

Klein, "Optical Efficiency for Different Liquid Crystal Colour Displays", Digital Media Department, HPL-2000-83, Jun. 29, 2000, 18 pgs.

Kogelnik, "Coupled Wave Theory for Thick Hologram Gratings", The Bell System Technical Journal, vol. 48, No. 9, Nov. 1969, pp. 2909-2945.

Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.

Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.

Lauret et al., "Solving the Optics Equation for Effective LED Applications", Gaggione North America, LLFY System Design Workshop 2010, Oct. 28, 2010, 26 pgs.

Lee, "Patents Shows Widespread Augmented Reality Innovation", PatentVue, May 26, 2015, 5 pgs.

Levola, "Diffractive optics for virtual reality displays", Journal of the SID, 2006, 14/5, pp. 467-475.

Levola et al., "Near-to-eye display with diffractive exit pupil expander having chevron design", Journal of the SID, 2008, 16/8, pp. 857-862.

Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.

Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.

Li et al., "Light Pipe Based Optical Train and its Applications", Proceedings vol. 5524, Novel Optical Systems Design and Optimization VII, Oct. 24, 2004, doi: 10.1117/12.559833, 10 pgs.

Li et al., "Novel Projection Engine with Dual Paraboloid Reflector and Polarization Recovery Systems", Wavien Inc., SPIE EI 5289-38, Jan. 21, 2004, 49 pgs.

Li et al., "Polymer crystallization/melting induced thermal switching in a series of holographically patterned Bragg reflectors", Soft Matter, Jul. 11, 2005, vol. 1, pp. 238-242.

Lin et al., "Ionic Liquids in Photopolymerizable Holographic Materials", in book: Holograms—Recording Materials and Applications, Nov. 9, 2011, 21 pgs.

(56) References Cited

OTHER PUBLICATIONS

Liu et al., "Holographic Polymer Dispersed Liquid Crystals" Materials, Formation and Applications, Advances in OptoElectronics, Nov. 30, 2008, vol. 2008, Article ID 684349, 52 pgs.
Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, vol. 95, No. 3, Feb. 1, 2004, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
Mcleod, "Axicons and Their Uses", Journal of the Optical Society of America, Feb. 1960, vol. 50, No. 2, pp. 166-169.
Mcmanamon et al., "A Review of Phased Array Steering for Narrow-Band Electrooptical Systems", Proceedings of the IEEE, Jun. 2009, vol. 97, No. 6, pp. 1078-1096.
Mcmanamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering vol. Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, 117 pgs., DOI:http://dx.doi.org/10.6100/IR634422.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Saleh et al., "Fourier Optics: 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.

(56) References Cited

OTHER PUBLICATIONS

Seiberle et al., "Photo-aligned anisotropic optical thin films", Journal of the SID 12/1, 2004, 6 pgs.
Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Smith et al., "RM-PLUS—Overview", Licrivue, Nov. 5, 2013, 16 pgs.
Sony Global, "Sony Releases the Transparent Lens Eyewear 'SmartEyeglass Developer Edition", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, pp. 6289DH-1-6289DH-10, doi: 10.1117/12.679416.
Sun et al., "Transflective multiplexing of holographic polymer dispersed liquid crystal using Si additives", eXPRESS Polymer Letters, 2011, vol. 5, No. 1, pp. 73-81.
Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable vol. gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 3 pgs., doi: 10.1117/2.1200612.0475.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.
Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.

(56) References Cited

OTHER PUBLICATIONS

Ye, "Three-dimensional Gradient Index Optics Fabricated in Diffusive Photopolymers", Thesis, Department of Electrical, Computer and Energy Engineering, University of Colorado, 2012, 224 pgs.

Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.

Yeralan et al., "Switchable Bragg grating devices for telecommunications applications", Opt. Eng., Aug. 2012, vol. 41, No. 8, pp. 1774-1779.

Yoshida et al., "Nanoparticle-Dispersed Liquid Crystals Fabricated by Sputter Doping", Adv. Mater., 2010, vol. 22, pp. 622-626.

Zhang et al., "Dynamic Holographic Gratings Recorded by Photopolymerization of Liquid Crystalline Monomers", J. Am. Chem. Soc., 1994, vol. 116, pp. 7055-7063.

Zhang et al., "Switchable Liquid Crystalline Photopolymer Media for Holography", J. Am. Chem. Soc., 1992, vol. 114, pp. 1506-1507.

Zhao et al., "Designing Nanostructures by Glancing Angle Deposition", Proc. of SPIE, Oct. 27, 2003, vol. 5219, pp. 59-73.

Zlębacz, "Dynamics of nano and micro objects in complex liquids", Ph.D. dissertation, Institute of Physical Chemistry of the Polish Academy of Sciences, Warsaw 2011, 133 pgs.

Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526, doi:10.1016/j.sna.2006.12.006.

Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.

Bleha et al., "D-ILA Technology for High Resolution Projection Displays", Sep. 10, 2003, Proceedings, vol. 5080, 11 pgs., doi:10.1117/12.497532.

Bone, "Design Obstacles for LCOS Displays in Projection Applications "Optics architectures for LCOS are still evolving"", Aurora Systems Inc., Bay Area SID Seminar, Mar. 27, 2001, 22 pgs.

Born et al., "Optics of Crystals", Principles of Optics 5th Edition 1975, pp. 705-707.

Bourzac, "Magic Leap Needs to Engineer a Miracle", Intelligent Machines, Jun. 11, 2015, 7 pgs.

Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.

Bowley et al., "Variable-wavelength switchable Bragg gratings formed in polymer-dispersed liquid crystals", Applied Physics Letters, Jul. 2, 2001, vol. 79, No. 1, pp. 9-11, DOI: 10.1063/1.1383566.

Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738, DOI: 10.1080/00222348.2013.808926.

Brown, "Waveguide Displays", Rockwell Collins, 2015, 11 pgs.

Bruzzone et al., "Compact, high-brightness LED illumination for projection systems", Journal of the Society for Information Display, vol. 17, No. 12, Dec. 2009, pp. 1043-1049, DOI: 10.1189/JSID17.12.1043.

Buckley, "Colour holographic laser projection technology for heads-up and instrument cluster displays", Conference: Proc. SID Conference 14th Annual Symposium on Vehicle Displays, Jan. 2007, 5 pgs.

Buckley, "Pixtronix DMS technology for head-up displays", Pixtronix, Inc., Jan. 2011, 4 pgs.

Buckley et al., "Full colour holographic laser projector HUD", Light Blue Optics Ltd., Aug. 10, 2015, 5 pgs.

Buckley et al., "Rear-view virtual image displays", in Proc. SID Conference 16th Annual Symposium on Vehicle Displays, Jan. 2009, 5 pgs.

Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.

Bunning et al., "Electro-optical photonic crystals formed in H-PDLCs by thiol-ene photopolymerization", American Physical Society, Annual APS, Mar. 3-7, 2003, abstract #R1.135.

Bunning et al., "Holographic Polymer-Dispersed Liquid Crystals (H-PDLCs)1", Annual Review of Material Science, 2000, vol. 30, pp. 83-115.

Bunning et al., "Morphology of Anisotropic Polymer Dispersed Liquid Crystals and the Effect of Monomer Functionality", Journal of Polymer Science: Part B: Polymer Physics, Jul. 30, 1997, vol. 35, pp. 2825-2833.

Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662, DOI: 10.1002/adma.200900298.

Butler et al., "Diffractive Properties of Highly Birefringent Volume Gratings: Investigation", Journal of Optical Society of America, Feb. 2002, vol. 19, No. 2, pp. 183-189.

Cai et al., "Recent advances in antireflective surfaces based on nanostructure arrays", Materials Horizons, 2015, vol. 2, pp. 37-53, DOI: 10.1038/c4mh00140k.

Cameron, "Optical Waveguide Technology & Its Application In Head Mounted Displays", Proc. of SPIE, May 22, 2012, vol. 8383, pp. 83830E-1-83830E-11, doi: 10.1117/12.923660.

Caputo et al., "POLICRYPS Composite Materials: Features and Applications", Advances in Composite Materials—Analysis of Natural and Man-Made Materials, www.intechopen.com, Sep. 2011, pp. 93-118.

Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51, DOI: 10.1109/JDT.2005.864156.

Carclo Optics, "Guide to choosing secondary optics", Carclo Optics, Dec. 15, 2014, www.carclo-optics.com, 48 pgs.

Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558, first published Apr. 5, 2011.

Cheng et al., "Design of an ultra-thin near-eye display with geometrical waveguide and freeform optics", Optics Express, Aug. 2014, 16 pgs., DOI:10.1364/OE.22.020705.

Chi et al., "Ultralow-refractive-index optical thin films through nanoscale etching of ordered mesoporous silica films", Optic Letters, May 1, 2012, vol. 37, No. 9, pp. 1406-1408, first published Apr. 19, 2012.

Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.

Cho et al., "Electro-optic Properties of CO2 Fixed Polymer/Nematic LC Composite Films", Journal of Applied Polymer Science, Nov. 5, 2000, vol. 81, Issue 11, pp. 2744-2753.

Cho et al., "Optimization of Holographic Polymer Dispersed Liquid Crystals for Ternary Monomers", Polymer International, Nov. 1999, vol. 48, pp. 1085-1090.

Colegrove et al., "P-59: Technology of Stacking HPDLC for Higher Reflectance", SID 00 Digest, May 2000, pp. 770-773.

Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.

Dainty, "Some statistical properties of random speckle patterns in coherent and partially coherent illumination", Optica Acta, Mar. 12, 1970, vol. 17, No. 10, pp. 761-772.

Date, "Alignment Control in Holographic Polymer Dispersed Liquid Crystal", Journal of Photopolymer Science and Technology, Nov. 2, 2000, vol. 13, No. 2, pp. 289-294.

Date et al., "52.3: Direct-viewing Display Using Alignment-controlled PDLC and Holographic PDLC", Society for Information Display Digest, May 2000, pp. 1184-1187, DOI: 10.1889/1.1832877.

Date et al., "Full-color reflective display device using holographically fabricated polymer-dispersed liquid crystal (HPDLC)", Journal of the SID, 1999, vol. 7, No. 1, pp. 17-22.

(56) References Cited

OTHER PUBLICATIONS

De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537], DOI: 10.1080/15421400802432584.
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212, DOI: 10.1063/1.1807027.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.
Forman et al., "Materials development for PhotoINhibited Super-Resolution (PINSR) lithography", Proc. of SPIE, 2012, vol. 8249, pp. 824904-1-824904-9, doi: 10.1117/12.908512.
Forman et al., "Radical diffusion limits to photoinhibited super-resolution lithography", Phys. Chem. Chem. Phys., May 31, 2013, vol. 15, pp. 14862-14867, DOI: 10.1039/c3cp51512.
Friedrich-Schiller, "Spatial Noise and Speckle", Version 1.12.2011, Dec. 2011, Abbe School of Photonics, Jena, Germany, 27 pgs.
Fujii et al., "Nanoparticle-polymer-composite vol. gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, pp. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
Harbers et al., "I-15.3: LED Backlighting for LCD-HDTV", Journal of the Society for Information Display, 2002, vol. 10, No. 4, pp. 347-350.
Harbers et al., "Performance of High Power LED Illuminators in Color Sequential Projection Displays", Lumileds Lighting, 2007, 4 pgs.
Harbers et al., "Performance of High Power LED Illuminators in Color Sequential Projection Displays", Lumileds, Aug. 7, 2001, 11 pgs.
Harbers et al., "Performance of High-Power LED illuminators in Projection Displays", Proc. Int. Disp. Workshops, Japan. vol. 10, 2003, pp. 1585-1588.
Harding et al., "Reactive Liquid Crystal Materials for Optically Anisotropic Patterned Retarders", Merck, licrivue, 2008, ME-GR-RH-08-010, 20 pgs.
Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.
Hariharan, "Optical Holography: Principles, techniques and applications", Cambridge University Press, 1996, pp. 231-233.
Harris, "Photonic Devices", EE 216 Principals and Models of Semiconductor Devices, Autumn 2002, 20 pgs.
Harrold et al., "3D Display Systems Hardware Research at Sharp Laboratories of Europe: an update", Sharp Laboratories of Europe, Ltd., received May 21, 1999, 7 pgs.
Harthong et al., "Speckle phase averaging in high-resolution color holography", J. Opt. Soc. Am. A, vol. 14, No. 2, Feb. 1997, pp. 405-409.
Hasan et al., "Tunable-focus lens for adaptive eyeglasses", Optics Express, Jan. 23, 2017, vol. 25, No. 2, 1221, 13 pgs.
Hasman et al., "Diffractive Optics: Design, Realization, and Applications", Fiber and Integrated Optics, vol. 16, 1997, pp. 1-25.
Hata et al., "Holographic nanoparticle-polymer composites based on step-growth thiol-ene photopolymerization", Optical Materials Express, vol. 1, No. 2, Jun. 1, 2011, pp. 207-222.
He et al., "Dynamics of peristrophic multiplexing in holographic polymer-dispersed liquid crystal", Liquid Crystals, Mar. 26, 2014, vol. 41, No. 5, pp. 673-684.
He et al., "Holographic 3D display based on polymer-dispersed liquid-crystal thin films", Proceedings of China Display/Asia Display 2011, pp. 158-160.
He et al., "Properties of vol. Holograms Recording in Photopolymer Films with Various Pulse Exposures Repetition Frequencies", Proceedings of SPIE vol. 5636, Bellingham, WA, 2005, pp. 842-848, doi: 10.1117/12.580978.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling the Anisotropy of Holographic Polymer-Dispersed Liquid-Crystal Gratings", Physical Review E, Jun. 11, 2002, vol. 65, pp. 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.

(56) References Cited

OTHER PUBLICATIONS

Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Jeng et al., "Aligning liquid crystal molecules", SPIE, 2012, 10.1117/2.1201203.004148, 2 pgs.
Jo et al., "Control of Liquid Crystal Pretilt Angle using Polymerization of Reactive Mesogen", IMID 2009 Digest, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, pp. 74070D-1-74070D-11, CCC code: 0277-786X/09, doi: 10.1117/12.826531.
Karp et al., "Planar micro-optic solar concentrator", Optics Express, Jan. 18, 2010, vol. 18, No. 2, pp. 1122-1133.
International Preliminary Report on Patentability for International Application PCT/GB2009/051676, issued Jun. 14, 2011, mailed Jun. 23, 2011, 6 pgs.
International Preliminary Report on Patentability for International Application PCT/GB2011/000349, issued Sep. 18, 2012, mailed Sep. 27, 2012, 10 pgs.
International Preliminary Report on Patentability for International Application PCT/GB2012/000331, issued Oct. 8, 2013, mailed Oct. 17, 2013, 8 pgs.
International Preliminary Report on Patentability for International Application PCT/GB2012/000677, issued Feb. 25, 2014, mailed Mar. 6, 2014, 5 pgs.
International Preliminary Report on Patentability for International Application PCT/GB2013/000005, issued Jul. 8, 2014, mailed Jul. 17, 2014, 12 pgs.
International Preliminary Report on Patentability for International Application PCT/GB2014/000295, issued Feb. 2, 2016, mailed Feb. 11, 2016, 4 pgs.
International Preliminary Report on Patentability for International Application PCT/GB2015/000225, issued Feb. 14, 2017, mailed Feb. 23, 2017, 8 pgs.
International Preliminary Report on Patentability for International Application PCT/GB2015/000274, Issued Mar. 28, 2017, mailed Apr. 6, 2017, 8 pgs.
International Preliminary Report on Patentability for International Application PCT/GB2016/000014, issued Jul. 25, 2017, mailed Aug. 3, 2017, 7 pgs.
International Preliminary Report on Patentability for International Application PCT/US2014/011736, issued Jul. 21, 2015, mailed Jul. 30, 2015, 9 pgs.
International Preliminary Report on Patentability for International Application PCT/US2016/017091, issued Aug. 15, 2017, mailed Aug. 24, 2017, 5 pgs.
International Preliminary Report on Patentability for International Application PCT/US2021/034315, Report issued Nov. 17, 2022, Mailed on Dec. 8, 2022, 11 Pgs.
International Search Report and Written Opinion for International Application No. PCT/US2021/073035, Search completed Feb. 23, 2022, Mailed Mar. 22, 2022, 20 pgs.
International Search Report and Written Opinion for International Application No. PCT/US2014/011736, completed Apr. 18, 2014, mailed May 8, 2014, 10 pgs.
International Search Report and Written Opinion for International Application No. PCT/US2021/034315, Search completed Aug. 13, 2021, Mailed Sep. 9, 2021, 18 Pgs.
International Search Report and Written Opinion for International Application PCT/GB2009/051676, completed May 10, 2010, mailed May 18, 2010, 7 pgs.
International Search Report and Written Opinion for International Application PCT/US2016/017091, completed by the European Patent Office on Apr. 20, 2016, 7 pgs.
International Search Report for International Application PCT/GB2014/000295, completed Nov. 18, 2014, mailed Jan. 5, 2015, 4 pgs.
International Search Report for International Application PCT/GB2017/000040, mailed Jul. 18, 2017, completed Jul. 10, 2017, 3 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, mailed Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office on Jun. 27, 2016, 4 pgs.
Written Opinion for International Application No. PCT/GB2011/000349, completed Aug. 17, 2011, mailed Aug. 25, 2011, 9 pgs.
Written Opinion for International Application No. PCT/GB2012/000331, completed Aug. 29, 2012, mailed Sep. 6, 2012, 7 pgs.
Written Opinion for International Application No. PCT/GB2012/000677, completed Dec. 10, 2012, mailed Dec. 17, 2012, 4 pgs.
Written Opinion for International Application No. PCT/GB2013/000005, search completed Jul. 16, 2013, mailed Jul. 24, 2013, 11 pgs.
Written Opinion for International Application No. PCT/GB2014/000295, search completed Nov. 18, 2014, mailed Jan. 5, 2015, 3 pgs.
Written Opinion for International Application No. PCT/GB2015/000225, search completed Nov. 10, 2015, mailed Feb. 4, 2016, 7 pgs.
Written Opinion for International Application No. PCT/GB2015/000274, search completed Jan. 7, 2016, mailed Jan. 19, 2016, 7 pgs.
Written Opinion for International Application No. PCT/GB2016/000014, search completed Jun. 27, 2016, mailed Jul. 7, 2016, 6 pgs.
Written Opinion for International Application No. PCT/GB2017/000040, search completed Jul. 10, 2017, mailed Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.
"Application Note AN16: Optical Considerations for Bridgelux LED Arrays", BridgeLux, Jul. 31, 2010, 23 pgs.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.

(56) References Cited

OTHER PUBLICATIONS

"BragGrate—Deflector: Transmitting vol. Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.
"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", LUXEON Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs., doi:10.1117/12.808855.
Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amundson et al., "Morphology and electro-optic properties of polymer-dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103, first published Dec. 22, 2008.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the Society for Information Display, May 18, 2009, vol. 17, No. 8, pp. 659-664, DOI: 10.1889/JSID17.8.659.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350, DOI: 10.1080/02678290310001605910.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631, doi:10.1039/B922303G.
Bleha et al., "Binocular Holographic Waveguide Visor Display", SID Symposium Digest of Technical Papers, Holoeye Systems Inc., Jun. 2014, San Diego, CA, 4 pgs.
International Preliminary Report on Patentability for International Application PCT/US2021/073035, Report issued Jun. 13, 2023, Mailed on Jun. 29, 2023, 16 pgs.

\* cited by examiner

EYE GLOW SUPPRESSION IN WAVEGUIDE BASED DISPLAYS

CROSS-REFERENCED APPLICATIONS

This application claims priority to U.S. Provisional Application 63/128,645 filed Dec. 21, 2020 and U.S. Provisional Application 63/129,270 filed Dec. 22, 2020, the disclosures of which are herein incorporated by reference in their entirety.

FIELD OF THE INVENTION

The present invention generally relates to suppressing eye glow in waveguide systems.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection (TIR).

Fabrication of waveguides can include the use of material systems that allow for the recording of holographic optical elements within the waveguides. One class of such material includes polymer dispersed liquid crystal (PDLC) mixtures, which are mixtures containing photopolymerizable monomers and liquid crystals. A further subclass of such mixtures includes holographic polymer dispersed liquid crystal (HPDLC) mixtures. Holographic optical elements, such as volume phase gratings, can be recorded in such a liquid mixture by illuminating the material with two mutually coherent laser beams. During the recording process, the monomers polymerize, and the mixture undergoes a photopolymerization-induced phase separation, creating regions densely populated by liquid crystal micro-droplets, interspersed with regions of clear polymer. The alternating liquid crystal-rich and liquid crystal-depleted regions form the fringe planes of the grating. The resulting grating, which is commonly referred to as a switchable Bragg grating (SBG), has all the properties normally associated with volume or Bragg gratings but with much higher refractive index modulation ranges combined with the ability to electrically tune the grating over a continuous range of diffraction efficiency (the proportion of incident light diffracted into a desired direction). The latter can extend from non-diffracting (cleared) to diffracting with close to 100% efficiency.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for augmented reality (AR) and virtual reality (VR), compact head-up displays (HUDs) and helmet-mounted displays or head-mounted displays (HMDs) for road transport, aviation, and military applications, and sensors for biometric and laser radar (LIDAR) applications.

SUMMARY OF THE DISCLOSURE

Various embodiments are directed to a waveguide display including: a source of image modulated light; a waveguide having an eye-facing surface and an external surface facing the outside world; an input coupler for coupling the light into a total reflection internal path in the waveguide; at least one grating for providing beam expansion and extracting light from the waveguide towards an eyebox; a polymer grating structure including a modulation depth and a grating pitch. The modulation depth is greater than the grating pitch across at least a portion of the polymer grating structure. The polymer grating structure is configured to diffract light entering the waveguide from the outside world or stray light generated within the waveguide away from optical paths that are refracted through the external surface into the outside world. The polymer grating structure does not substantially disturb the propagation of image modulated light within the waveguide and the extraction of the image modulated light towards the eyebox. The stray light generated within the waveguide comprises at least one selected from the group consisting of: light scattered from the grating material; zero order diffracted image modulated light; and image modulated light propagating along optical paths that are not extracted from the waveguide towards the eyebox.

In various embodiments, the polymer grating structure further includes a backfill material between adjacent polymer regions. The backfill material may have a refractive index higher or lower than the refractive index of the polymer regions.

In still various embodiments, the backfill material occupies a space at a bottom portion of the space between adjacent portions of the polymer grating structure and the air occupies the space from above the top surface of the backfill material to the modulation depth.

In still various embodiments, the backfill material includes an isotropic material.

In still various embodiments, the isotropic backfill material includes a birefringent material.

In still various embodiments, the birefringent material includes a liquid crystal material.

In still various embodiments, a modulation depth of the polymer grating structure is greater than a wavelength of visible light.

In still various embodiments, the grating pitch is the spacing of diffractive features of the polymer grating structure and the modulation depth is the depth of the polymer grating structure.

In still various embodiments, the grating pitch of the polymer grating structure is 0.35 μm to 1 μm and the modulation depth of the polymer grating structure is 1 μm to 10 μm.

In still various embodiments, the ratio of the modulation depth of the polymer grating structure to the grating pitch spacing lies in the range from 1:1 to 10:1.

In still various embodiments, the polymer grating structure is configured as a multiplexed grating.

In still various embodiments, a portion of the polymer grating structure is configured to outcouple light from the waveguide.

In still various embodiments, a portion of the polymer grating structure is configured as a beam expander.

In still various embodiments, a portion of the polymer grating structure is configured to couple image modulated light from the source into a total reflection internal path in the waveguide.

In still various embodiments, the modulation depth of the polymer grating structure is configured to incouple a defined balance of S polarized light and P polarized light with a high degree of efficiency.

In still various embodiments, the polymer grating structure further includes alternating polymer regions and air gap regions and the refractive index difference between the polymer regions and the air gap regions is in the range from 1.4 to 1.9.

In still various embodiments, the refractive index difference between the polymer regions and the birefringent material is 0.01 to 0.2.

In still various embodiments, the polymer grating structure includes a two-dimensional lattice structure or a three-dimensional lattice structure.

In still various embodiments, the polymer grating structure includes: polymer diffracting features; and a birefringent material between adjacent polymer diffracting features, wherein the birefringent material has a higher refractive index than the polymer diffracting features.

In still various embodiments, the input coupler is grating or a prism.

In still various embodiments, the modulation depth of the polymer grating structure varies across the waveguide to provide a spatially varying polarization-dependent diffraction efficiency characteristic.

In still various embodiments, the modulation depth of the polymer grating structure varies across the waveguide to provide a spatially varying angle-dependent diffraction efficiency characteristic.

In still various embodiments, at least one of a spatial, angular, or polarization diffraction efficiency characteristic may be provided by backfilling the polymer grating structure with an optical material of specified refractive index or birefringence.

In still various embodiments, the polymer grating structure is configured as a Bragg grating or a Raman-Nath grating.

In still various embodiments, the polymer grating structure is formed on the external surface of the waveguide and/or the eye facing surface of the waveguide and at least partially overlaps the input coupler and/or the at least one grating for providing beam expansion and extracting light from the waveguide.

In still various embodiments, the polymer grating structure includes regions including a Bragg grating, a Raman-Nath grating, and no grating. The regions at least partially cover the input coupler and the at least one grating for providing beam expansion and extracting light.

In still various embodiments, the waveguide display further includes a light control layer overlapping regions of the polymer grating structure containing no grating.

In still various embodiments, the light control layer provides at least one selected from the group consisting of: polarization rotation, polarization-selective absorption, polarization-selective transmission, polarization-selective diffraction, angle-selective transmission, angle selective absorption, anti-reflectivity, and transmission within a defined spectral bandwidth.

In still various embodiments, the polymer grating structure includes a rolled K-vector grating with slant angles varying continuously or in piecewise steps.

In still various embodiments, the polymer grating structure includes a grating with spatially varying pitch.

In still various embodiments, the light entering the waveguide from the outside world is provided by an external light source and enters the waveguide though the external surface and/or the eye-facing surface of the waveguide.

In still various embodiments, the light entering the waveguide from the outside world includes reflections off an anatomical surface of a viewer of the display.

In still various embodiments, the waveguide includes two substrates and the polymer grating structure is either sandwiched between the two substrates or positioned on an external surface of either substrate.

In still various embodiments, the polymer grating structure is a composite of at least one type of polymer and at least one other material.

In still various embodiments, the polymer grating structure is a composite of a polymer and at least one other material, wherein the polymer is removed after formation of the polymer grating structure.

In still various embodiments, the at least one other material includes nanoparticles.

In still various embodiments, the at least one other material includes functionalized nanoparticles.

In still various embodiments, the polymer grating structure is coated with an optical material.

In still various embodiments, the polymer grating structure is coated with a reflective optical material.

In still various embodiments, a coating applied to the polymer grating structure provides an effective index up to 2.5.

In still various embodiments, the polymer grating structure is coated with a first material and the coated grating is backfilled with a second material of refractive index higher than the refractive index of the first material.

In still various embodiments, the polymer grating structure is coated with a first material and the coated grating is backfilled with a second material of refractive index lower than the refractive index of the first material.

In still various embodiments, the polymer grating structure includes a first grating structure positioned on the external surface of the waveguide and a second grating structure positioned on the eye-facing surface of the waveguide.

In still various embodiments, the first grating structure and the second grating structure have different grating periods.

Various embodiments are further directed to a method for reducing eyeglow from a waveguide display comprising: providing a source of image modulated light, a waveguide, an input coupler; and at least one grating for providing beam expansion and extracting light from the waveguide towards an eyebox, where the waveguide includes an eye-facing surface and an external surface facing the outside world; providing a polymer grating structure comprising a modulation depth and a grating pitch, where the modulation depth is greater than the grating pitch across at least a portion of the polymer grating structure; directing image modulated light into a total internal reflection path in the waveguide, beam expanding the light and extracting it towards the eyebox; directing light propagating within the waveguide away from optical paths that are refracted through the external surface into the outside world using the polymer grating structure; and diffracting light entering the waveguide from the outside world or stray light generated within the waveguide away from optical paths that are refracted through the external surface using the polymer grating structure.

Various embodiments are further directed to waveguide-based display devices including:

a waveguide comprising an in-coupling optical element and an out-coupling optical element, where the in-coupling optical element is configured to in-couple image modulated light and the out-coupling optical element is configured to out-couple the image modulated light towards a user, wherein the waveguide includes an outer surface and an inner surface opposite to the outer surface, and where the inner surface is closer to the user than the outer surface; and a partially light blocking layer above the outer surface of the waveguide opposite to the user, where the partially light blocking layer is configured to keep eye glow light exiting the outer surface of the waveguide from entering the environment outside the outer surface of the waveguide.

In various embodiments, the eye glow light includes light directed out of the outer surface away from the user.

In still various embodiments, the eye glow light is light reflected by the out-coupling optical element, the in-coupling optical element, and/or the inner surface.

In still various embodiments, the waveguide causes the in-coupled light to be directed in total internal reflection (TIR) between the inner surface and the outer surface.

In still various embodiments, the partially light blocking layer absorbs light in a portion of the visible light spectrum.

In still various embodiments, the partially light blocking layer includes a narrowband dye absorber layer.

In still various embodiments, the narrowband dye absorber layer includes a light absorbing dye suspended in a transparent matrix.

In still various embodiments, the partially light blocking layer includes a metamaterial absorbing layer.

In still various embodiments, the metamaterial absorbing layer includes an absorber formed in a metamaterial.

In still various embodiments, the partially light blocking layer deflects light in a portion of the visible light spectrum toward the user.

In still various embodiments, the partially light blocking layer includes a dielectric or dichroic reflector.

In still various embodiments, the partially light blocking layer transforms the light in a portion of the visible light spectrum to non-visible radiation.

In still various embodiments, the partially light blocking layer includes quantum dots or phosphors.

In still various embodiments, the partially light blocking layer diffracts light in a portion of the visible light spectrum into a path that does not enter the environment.

In still various embodiments, the partially light blocking layer includes a reflective or transmissive diffractive structure.

In still various embodiments, the partially light blocking layer includes a reflective grating layer.

In still various embodiments, the reflective grating layer is configured to direct light towards a light absorbing element.

In still various embodiments, the reflective grating layer is positioned between two waveguide substrates.

In still various embodiments, the reflective grating layer includes a holographically recorded grating.

In still various embodiments, the partially light blocking layer includes a plurality of overlapping diffractive structures, each structure configured to diffract a unique angular bandwidth of eye-glow light and diffract it onto a light absorbing element.

In still various embodiments, the partially light blocking layer includes a plurality of multiplexed diffractive structures, each multiplexed diffractive structure configured to diffract a unique angular bandwidth of eye glow light onto a light absorber.

In still various embodiments, the partially light blocking layer is coated directly on the waveguide.

In still various embodiments, the partially light blocking layer is coated on a substrate disposed on the waveguide.

In still various embodiments, spacers are positioned between the substrate and the waveguide to form a gap between the substrate and the waveguide.

In still various embodiments, the gap is an air gap.

In still various embodiments, the substrate includes a protective layer.

In still various embodiments, the display device further includes another waveguide positioned below the waveguide.

In still various embodiments, the display device further includes spacers disposed between the waveguide and the other waveguide to form a gap between the waveguide and the other waveguide.

In still various embodiments, the gap includes an air gap.

In still various embodiments, the display device further includes another partially light blocking layer, where the other waveguide is configured to display a different wavelength of light than the waveguide, where the partially light blocking layer is configured to block a wavelength of light corresponding to the wavelength of light the waveguide is configured to display, and where the other partially light blocking layer is configured to block the wavelength of light corresponding to the wavelength of light the other waveguide is configured to display.

In still various embodiments, the other waveguide is configured to display a different wavelength of light than the waveguide, where the partially light blocking layer is configured to block the wavelength of light corresponding to the wavelength of light of the waveguide and the other waveguide.

In still various embodiments, the waveguide is a first waveguide and the display device further includes a second waveguide and a third waveguide.

In still various embodiments, the first waveguide, the second waveguide, and the third waveguide are each configured to display different wavelengths of light.

In still various embodiments, the partially light blocking layer is a first partially light blocking layer and the display device further includes a second partially light blocking layer and a third partially light blocking layer, where the first partially light blocking layer is configured to block the wavelength of light corresponding to the wavelength of light the first waveguide is configured to display, where the second partially light blocking layer is configured to block the wavelength of light corresponding to the wavelength of light the second waveguide is configured to display, and where the third partially light blocking layer is configured to block the wavelength of light corresponding to the wavelength of light the third waveguide is configured to display.

In still various embodiments, the second waveguide is disposed between the first waveguide and the second waveguide.

In still various embodiments, the second partially light blocking layer is formed on a top surface of the second waveguide.

In still various embodiments, the second partially light blocking layer is formed on a substrate disposed above the first waveguide.

In still various embodiments, the display device further includes spacers disposed between the substrate and the first waveguide to form an air gap between the substrate and the first waveguide.

In still various embodiments, the substrate includes a protective layer.

In still various embodiments, the partially light blocking layer overlaps the out-coupling optical element and not the in-coupling optical element.

Further, various embodiments are directed to an augmented or mixed reality head-worn display device including: the display device described throughout this disclosure; and a projector configured to project the image containing light towards the in-coupling optical element.

In still various embodiments, the partially light blocking layer comprises a liquid crystal polymer or a cholesteric liquid crystal.

In still various embodiments, the partially light blocking layer comprises a linear polarizer aligned with a principal k-vector parallel with the out-coupling optical element.

In still various embodiments, the partially light blocking layer includes a phase scrambler that causes light to be directed back into the waveguide by the phase scrambler to be out of phase with image light out-coupled towards the user by the out coupling optical element.

In still various embodiments, the partially light blocking layer includes a microlouver film.

Further, various embodiments are directed to a method of suppressing eye glow light, the method comprising:
providing:
   a source of image modulated light,
   a waveguide with an inner reflecting surface in proximity to a user's eye and an outer reflecting surface positioned above the inner reflecting surface, the waveguide supporting an in-coupling optical element and an out-coupling optical element, and
   a partially light blocking layer above the outer reflecting surface;
coupling image modulated light from the source of image modulated light into the waveguide;
extracting image modulated light for viewing out of the waveguide towards a user using the out-coupling optical element; and
blocking off-Bragg image modulated light from leaving the waveguide as eye glow light via the outer surface using the partially light blocking layer.

In various embodiments, blocking the off-Bragg image modulated light includes absorbing the off-Bragg image modulated light.

In still various embodiments, blocking the off-Bragg image modulated light includes deflecting the off-Bragg image modulated light toward the user.

In still various embodiments, blocking the off-Bragg image modulated light includes transforming the off-Bragg image modulated light into non-visible radiation.

In still various embodiments, blocking the off-Bragg image modulated light includes diffracting the off-Bragg image modulated light into a path that does not enter the environment.

In still various embodiments, the method further includes absorbing the diffracted off-Bragg image modulated light.

In still various embodiments, the method further includes attenuating the diffracted off-Bragg image modulated light.

BRIEF DESCRIPTION OF THE DRAWINGS

The description will be more fully understood with reference to the following figures, which are presented as exemplary embodiments of the invention and should not be construed as a complete recitation of the scope of the invention.

DETAILED DESCRIPTION

Figure 1A:
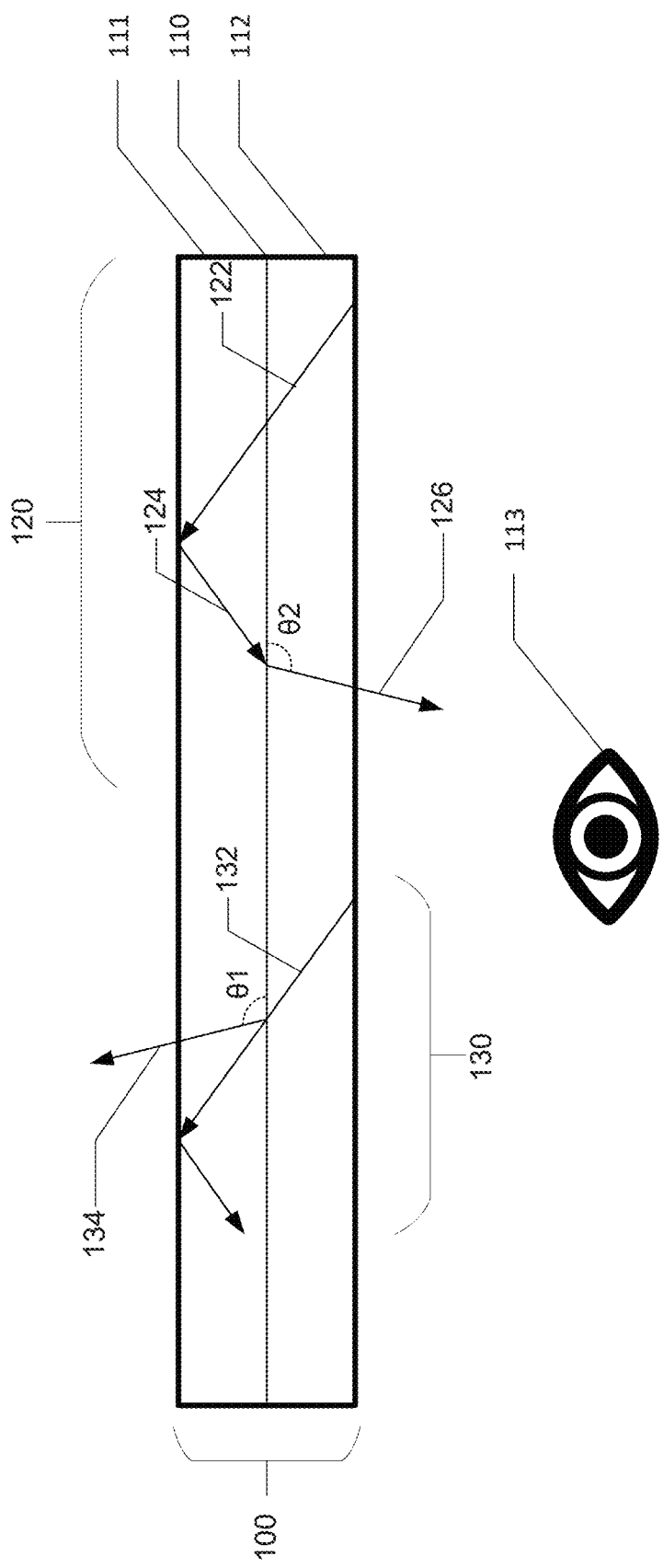
FIG. 1A conceptually illustrates the eye glow phenomenon as a product of off-Bragg interaction in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated, the term "on-axis" in relation to a ray or a beam direction refers to propagation parallel to an axis normal to the surfaces of the optical components described in relation to the invention. In the following description the terms light, ray, beam, and direction may be used interchangeably and in association with each other to indicate the direction of propagation of electromagnetic radiation along rectilinear trajectories. The term light and illumination may be used in relation to the visible and infrared bands of the electromagnetic spectrum. Parts of the following description will be presented using terminology commonly employed by those skilled in the art of optical design. As used herein, the term grating may encompass a grating comprised of a set of gratings in some embodiments. For illustrative purposes, it is to be understood that the drawings are not drawn to scale unless stated otherwise.

In waveguide-based displays light may be diffracted toward the user and also away from the user. Eye glow may include unwanted light emerging from the front face of a display waveguide (e.g. the waveguide face furthest from the eye) and originating at a reflective surface of the eye, a waveguide reflective surface and a surface of grating (due to leakage, stray light diffractions, scatter, and other effects). The light that is diffracted away is commonly called "eye-glow" and poses a liability for security, privacy, and social acceptability. "Eye glow" may refer to the phenomenon in which a user's eyes appear to glow or shine through an eye display caused by leakage of light from the display, which creates an aesthetic that can be unsettling to some people. In addition to concerns regarding social acceptability in a fashion sense, eye glow can present a different issue where, when there is sufficient clarity to the eye glow, a viewer looking at the user may be able to see the projected image intended for only the user. As such, eye glow can pose a serious security concern for many users. There are many sources of eye glow in near-eye displays, including but not limited to Fresnel reflections and off-Bragg diffractions. This may be an issue for all diffractive waveguide solutions (surface relief gratings, volume Bragg gratings, etc.) and optical combiner methods that may utilize see-through. In addition to blocking unwanted eye-glow light, the waveguides may maintain high transmission to allow the observer to still see the real world. Furthermore, the need for eye contact drives a highly transparent waveguide while blocking eye-glow light. Suppressing eye-glow light may be a selective light blocking technique for all waveguide and optical combiner augmented reality or mixed reality wearable devices. Eye-glow suppression may also be applied to waveguide based heads-up displays such as automotive heads-up displays or aerospace applied heads-up displays When eliminating eye glow from waveguide displays it is beneficial to strike a balance between configuring waveguide gratings to maximize image light propagation into the eyebox and directing any stray light away from paths that may be refracted through the front of the waveguide. Stray light here may include any image light that is not diffracted into the eyebox, due to diffraction efficiencies, and haze produced by the grating material and grating imperfection. The stray light that emerges from the outer surface of the waveguide may contribute to eye glow. In many cases, at least some of the stray light may emerge from the waveguide via the inner (near-eye) surface of the waveguide. The light from the inner may scatter off the user's face which may provide some degree of eyeglow if it is refracted through the front of the waveguide. For stray light to emerge as eyeglow, it may strike the outer surface of the waveguide at an angle smaller than the critical angle. In many cases, light paths taken by such light may have a polarization rotation relative to the image light that propagates towards the eyebox. In many embodiments, eyeglow light may have a high concentration around grating regions within which multiple beam grating interactions may result in unwanted light extraction, as in the case of fold gratings and dual interaction gratings, for example.

The disclosed eyeglow suppression systems may include one or more polymer grating structure which may offer advantages in terms of being able to divert stray light from the front surface while assisting or not disturbing the propagation of image light towards the eye box. In many embodiments, the polymer grating structure may be configured as a Bragg grating with a modulation depth and a grating pitch, where the modulation depth is greater than the grating pitch across at least a portion of the polymer grating structure. In some embodiments, the polymer grating structure may be configured as a Raman-Nath grating which acts in the Raman-Nath diffraction regime. The Raman-Nath grating may have a modulation depth less than the grating pitch across at least a portion of the polymer grating structure. The modulation depth of the polymer grating structure may be configured to incouple a defined balance of S polarized light and P polarized light with a high degree of efficiency.

In many embodiments, the polymer grating structure may have the properties of a Bragg grating across specified portions of the waveguide and the properties of a Raman-Nath grating across other portions of the waveguide. In many embodiments, the polymer grating structure may functionality operate entirely within the Bragg regime or entirely within the Raman-Nath regime for eyeglow suppression. The Bragg grating may be used where high diffraction efficiency and polarization selectivity are advantageous. The Bragg grating may overlap the fold grating regions, which are often associated with polarization rotations. A Raman-Nath grating may be advantageous where operation at large angles is beneficial, for example tor directing stray light towards an absorber or other type of light trapping features disposed around edges of the waveguide.

Waveguide architectures described herein can mitigate or suppress eye glow using a variety of different methods that can be used separately or in conjunction as appropriate depending on the application. Turning now to the drawings, in order to better illustrate the problem of eye glow, a diagram illustrating a source of eye glow in a waveguide display accordance with an embodiment of the invention is conceptually illustrated in FIG. 1A. The waveguide 100 includes a grating layer 110 that includes one or more holographic grating sandwiched between two substrates 111,112.

Area 120 of the waveguide 100 illustrates the intended operation of the waveguide display. In many embodiments, the holographic grating is designed to diffract beams under Bragg diffraction towards the eye side of the waveguide display. As shown, a beam 122 traveling within the waveguide 100 in a TIR path is diffracted at a predetermined angle θ2 to the holographic grating towards the eye side of the waveguide 100 upon interaction with a grating within the grating layer 110, passing through to the eyes 113 of a viewer. In some embodiments, light may be diffracted toward the eye side and also away from the eye side. The light that is diffracted away is commonly called "eye-glow" and poses a liability for security, privacy, and social acceptability. Area 130 of the waveguide 100 illustrates an off-Bragg interaction, which is a substantial source of eye glow in many waveguide displays. The incident beam 132 is weakly diffracted due to an off-Bragg interaction with a grating in the grating layer 110, causing a portion of the beam 132 to be diffracted at the predetermined angle θ1 as eye glow beam 134, which passes through to the side opposite the eye side (or the environmental side—i.e., the side opposite the output side) of the waveguide 100. This eye glow beam, when seen by an outside observer, can appear as eye glow. While the "eye side" is used herein to discuss the intended direction of diffraction, it can be readily appreciated that off-Bragg interaction can pose an issue for optic systems not designed to be worn over an eye, and therefore the architectures described herein can be easily applied to any optic system suffering from similar issues. For example, in a sensor, the off-Bragg light paths may result in stray light paths that can reduce the signal to noise ratio of the sensor. Eye glow can be an issue with infrared waveguides as well. For example, off-Bragg paths in eye trackers could result in detectable infrared emissions.

While the eye glow phenomenon and the intended operation are shown as occurring in separate locations of the waveguide 100, it is to be understood that the eye glow phenomenon and the intended operation can in fact occur concurrently throughout the waveguide display depending on the architecture of the device. Furthermore, while a significant contributor to eye glow is illustrated in FIG. 1A, it is contemplated that other factors can contribute to eye glow. For example, Fresnel reflection on the surface interface on the eye side of the waveguide display can also result in eye glow. In some cases, scattering, which may also take place on the surface of the user's eye, or solar illumination entering the waveguide and getting diffracted out of the waveguide may contribute to eyeglow.

Figure 1B:
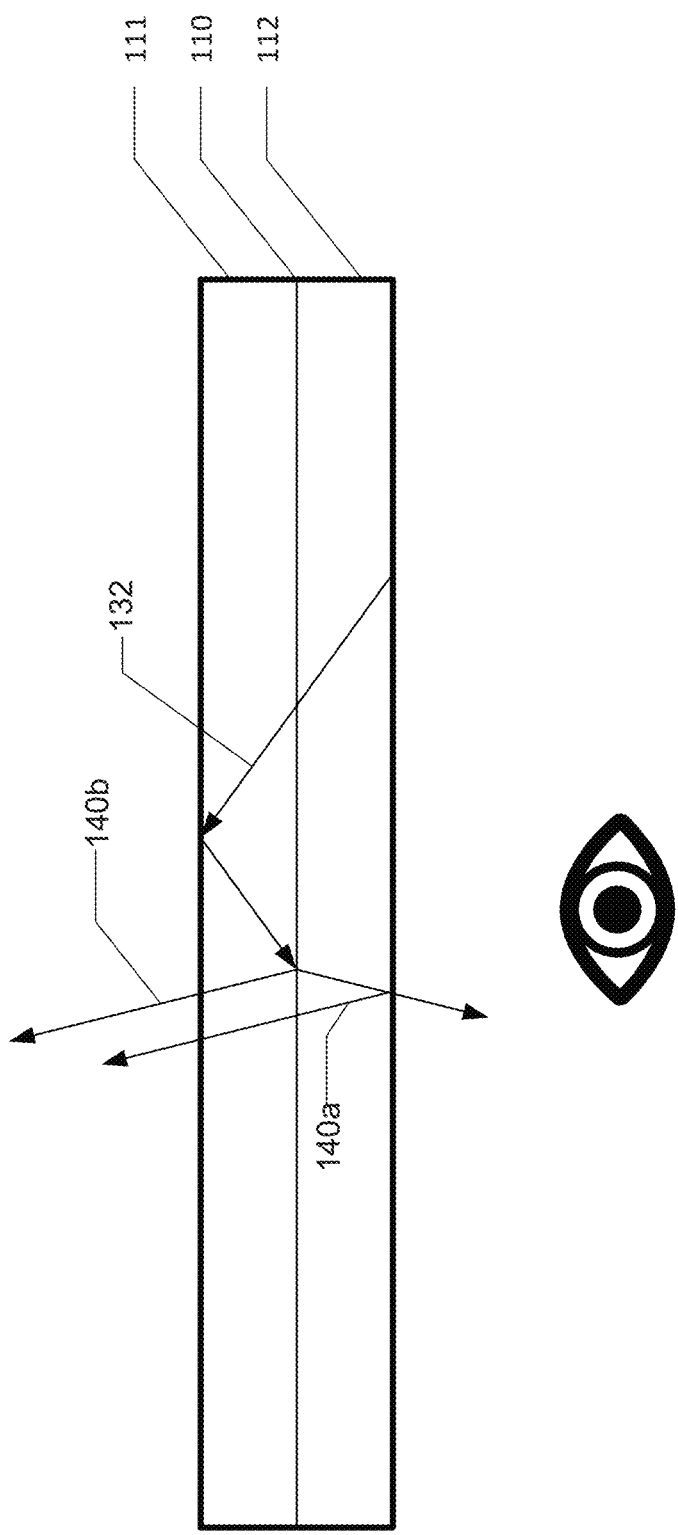
FIG. 1B conceptually illustrates the eye glow phenomenon as a product of Fresnel reflection in accordance with an embodiment of the invention.

Examples of reflections that cause eye glow in accordance with an embodiment of the invention are conceptually illustrated in FIG. 1B. As shown, a beam diffracted towards the user's eye can have a portion reflected back at the surface interface which represents a Fresnel reflection. The reflected beam 140a may travel through the waveguide and exit on the environmental side of the waveguide as an eye glow beam. A reflected beam 140b may also be produced by the grating layer 110. It is to be noted that FIGS. 1A and 1B illustrate general ray paths and interactions and may not show the nature of waveguiding optics in its entirety. For example, rays exiting and entering the waveguide at non-normal angles can result in a refractive change in angle at the waveguide's surfaces. With this understanding of the different sources of eye glow, different proposed eye glow suppression structures are described in further detail below.

Eye Glow Suppression Structures

Architectures for suppressing eye glow in accordance with various embodiments of the invention attempt to mitigate the cause of eye glow by reflecting and/or redirecting eye glow beams. Eye glow suppression structures can be introduced multiple times in the same display system, the specific configuration of which can be based on the particular system. For example, in systems that use multiple different waveguides (e.g. for different wavelength and/or angular bands), multiple eye glow suppression structures can be included in the overall system. In numerous embodiments, a single eye glow suppression structure can be included that mitigates eye glow beams from multiple waveguides. In addition to block the unwanted eye-glow light, the waveguides have high transmission to allow a user to see the real world. Thus, a highly transparent waveguide is advantageous while simultaneously blocking eye-glow light. Suppressing eye-glow light may be a selective light blocking technique for all waveguide and optical combiner AR/XR wearables.

In many embodiments, a diffractive element such as at least one reflection grating can be implemented to suppress a substantial portion of eye glow within a waveguide display. In multi-layered waveguide display systems, a grating layer having at least one of such reflection gratings can be implemented for each waveguide layer. The reflection grating can be implemented in many different ways. In some embodiments, the reflection grating is implemented as a holographic grating in a grating layer within a secondary waveguide. This secondary reflection waveguide can be disposed adjacent the base waveguide. In such configurations, the substrates of the two waveguides can be index-matched to provide a single TIR structure within which light can propagate. In several embodiments, the reflection waveguide and the base waveguide can be configured with an air gap in between. In a number of embodiments, the reflection grating is implemented in a grating layer disposed adjacent the substrate facing the environmental side and opposite the grating layer of the base waveguide. In such cases, the waveguide display can include three substrate layers that alternate and interleave with the two grating layers, forming a single TIR structure. The reflection grating can also be implemented as a surface relief grating. For example, a surface reflection grating can be implemented on the surface of the environmental side of the waveguide.

As described above, each waveguide layer in a multi-layered waveguide display can include a reflection grating, or reflection grating layer, for suppressing eye glow. Depending on the application, the reflection grating can be configured to reflect a predetermined wavelength and/or angular band. For example, in a three-layered RGB waveguide display system, each of the R, G, and B layer can be implemented with a respective reflection grating, or reflection grating layer, configured to reflect a spectral wavelength band corresponding to the layer (i.e., a reflection grating designed to reflect red light can be implemented for the R layer of the waveguide display). In several embodiments, the reflection gratings can be multiplexed. In a number of embodiments, the reflection grating(s) can be recorded or formed with grating vectors that conform to the rake angle of the waveguide display.

In addition to or in place of reflection gratings, filters can be utilized to suppress eyeglow. For example, a dichroic reflector or a dielectric mirror (e.g. dielectric reflector) can be applied and implemented on the surface of the environmental side of the waveguide. Similar to the configurations described above, a multi-layered waveguide display system can include a dichroic reflector for each waveguide layer, where each dichroic reflector is configured to reflect a specific wavelength and/or angular band corresponding to the individual waveguide layer. In many embodiments, the waveguide display includes an additional protective layer. In such cases, one of the dichroic reflectors desired for implementation can be incorporated onto the protective layer.

Another method for suppressing eye glow includes the use of quantum dots, which structures that can absorb light of a first wavelength and emit light of a second wavelength. In many embodiments, quantum dots can be incorporated within the substrate adjacent the environmental side of the waveguide. The quantum dots can be configured to absorb specific wavelengths of light corresponding to the particular waveguide layer within which it is incorporated. For example, quantum dots configured to absorb certain wavelengths of red corresponding to the red light source can be incorporated in a substrate of the red waveguide layer. The quantum dots can be further configured to emit light shifted to a predetermined wavelength band (e.g. infrared), allowing for the suppression of eye glow.

As can readily be appreciated, several methods and structures for suppressing eye glow can be implemented as appropriate in accordance with various embodiments of the invention. The specific configuration to be implemented can depend on the application. In many cases, the choice of method and structure utilized can include the balance of several factors, including but not limited to see-through transmission, suppression performance, costs, etc. Further, as noted above, rays that interact with the eye side interface can be reflected due to Fresnel reflection, resulting in eye glow. In many embodiments, eye glow rays due to Fresnel reflection can be mostly (or entirely) mitigated using an antireflective coating on the eye side surface of the waveguide. Optical structures, eye glow suppression structures, and related methods of implementation and application are discussed in turn below.

Optical Waveguide and Grating Structures

Optical structures recorded in waveguides can include many different types of optical elements, such as but not limited to diffraction gratings. Gratings can be implemented to perform various optical functions, including but not limited to coupling light, directing light, and preventing the transmission of light. In many embodiments, the gratings are surface relief gratings that reside on the outer surface of the waveguide. In other embodiments, the grating implemented is a Bragg grating (also referred to as a volume grating), which are structures having a periodic refractive index modulation. Bragg gratings can be fabricated using a variety of different methods. One process includes interferential exposure of holographic photopolymer materials to form periodic structures. Bragg gratings can have high efficiency with little light being diffracted into higher orders. The relative amount of light in the diffracted and zero order can be varied by controlling the refractive index modulation of the grating, a property that can be used to make lossy waveguide gratings for extracting light over a large pupil.

One class of Bragg gratings used in holographic waveguide devices is the Switchable Bragg Grating (SBG). SBGs can be fabricated by first placing a thin film of a mixture of photopolymerizable monomers and liquid crystal material between substrates. The substrates can be made of various types of materials, such glass and plastics. In many cases, the substrates are in a parallel configuration. In other embodiments, the substrates form a wedge shape. One or both substrates can support electrodes, typically transparent tin oxide films, for applying an electric field across the film. The grating structure in an SBG can be recorded in the liquid material (often referred to as the syrup) through photopolymerization-induced phase separation using interferential exposure with a spatially periodic intensity modulation. Factors such as but not limited to control of the irradiation intensity, component volume fractions of the materials in the mixture, and exposure temperature can determine the resulting grating morphology and performance. As can readily be appreciated, a wide variety of materials and mixtures can be used depending on the specific requirements of a given application. In many embodiments, HPDLC material is used. During the recording process, the monomers polymerize, and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The resulting volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from indium tin oxide (ITO). In the OFF state with no electric field applied, the extraordinary axis of the liquid crystals generally aligns normal to the fringes. The grating thus exhibits high refractive index modulation and high diffraction efficiency for P-polarized light. When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

Typically, the SBG elements are switched clear in 30 μs with a longer relaxation time to switch ON. The diffraction efficiency of the device can be adjusted, by means of the applied voltage, over a continuous range. In many cases, the device exhibits near 100% efficiency with no voltage applied and essentially zero efficiency with a sufficiently high voltage applied. In certain types of HPDLC devices, magnetic fields can be used to control the LC orientation. In some HPDLC applications, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The substrates used to form the HPDLC cell provide a total internal reflection (TIR) light guiding structure. Light can be coupled out of the SBG when the switchable grating diffracts the light at an angle beyond the TIR condition.

In some embodiments, LC can be extracted or evacuated from the SBG to provide an evacuated Bragg grating (EBG). EBGs can be characterized as a surface relief grating (SRG) that has properties very similar to a Bragg grating due to the depth of the SRG structure (which is much greater than that practically achievable using surface etching and other conventional processes commonly used to fabricate SRGs). The LC can be extracted using a variety of different methods, including but not limited to flushing with isopropyl alcohol and solvents. In many embodiments, one of the transparent substrates of the SBG is removed, and the LC is extracted. In further embodiments, the removed substrate is replaced. The SRG can be at least partially backfilled with a material of higher or lower refractive index. Such gratings offer scope for tailoring the efficiency, angular/spectral response, polarization, and other properties to suit various waveguide applications. Examples of EBGs and methods for manufacturing EBGs are discussed in US Pat. Pub. No. 2021/0063634, entitled "Evacuating Bragg Gratings and Methods of Manufacturing" and filed Aug. 28, 2020 which is hereby incorporated by reference in its entirety.

Waveguides in accordance with various embodiments of the invention can include various grating configurations designed for specific purposes and functions. In many embodiments, the waveguide is designed to implement a grating configuration capable of preserving eyebox size while reducing lens size by effectively expanding the exit pupil of a collimating optical system. The exit pupil can be defined as a virtual aperture where only the light rays which pass though this virtual aperture can enter the eyes of a user. In some embodiments, the waveguide includes an input grating optically coupled to a light source, a fold grating for providing a first direction beam expansion, and an output grating for providing beam expansion in a second direction, which is typically orthogonal to the first direction, and beam extraction towards the eyebox. As can readily be appreciated, the grating configuration implemented waveguide architectures can depend on the specific requirements of a given application. In some embodiments, the grating configuration includes multiple fold gratings. In several embodiments, the grating configuration includes an input grating and a second grating for performing beam expansion and beam extraction simultaneously. The second grating can include gratings of different prescriptions, for propagating different portions of the field-of-view, arranged in separate overlapping grating layers or multiplexed in a single grating layer. Furthermore, various types of gratings and waveguide architectures can also be utilized.

In several embodiments, the gratings within each layer are designed to have different spectral and/or angular responses. For example, in many embodiments, different gratings across different grating layers are overlapped, or multiplexed, to provide an increase in spectral bandwidth. In some embodiments, a full color waveguide is implemented using three grating layers, each designed to operate in a different spectral band (red, green, and blue). In other embodiments, a full color waveguide is implemented using two grating layers, a red-green grating layer and a green-blue grating layer. As can readily be appreciated, such techniques can be implemented similarly for increasing angular bandwidth operation of the waveguide. In addition to the multiplexing of gratings across different grating layers, multiple gratings can be multiplexed within a single grating layer—i.e., multiple gratings can be superimposed within the same volume. In several embodiments, the waveguide includes at least one grating layer having two or more grating prescriptions multiplexed in the same volume. In further embodiments, the waveguide includes two grating layers, each layer having two grating prescriptions multiplexed in the same volume. Multiplexing two or more grating prescriptions within the same volume can be achieved using various fabrication techniques. In a number of embodiments, a multiplexed master grating is utilized with an exposure configuration to form a multiplexed grating. In many embodiments, a multiplexed grating is fabricated by sequentially exposing an optical recording material layer with two or more configurations of exposure light, where each configuration is designed to form a grating prescription. In some embodiments, a multiplexed grating is fabricated by exposing an optical recording material layer by alternating between or among two or more configurations of exposure light, where each configuration is designed to form a grating prescription. As can readily be appreciated, various techniques, including those well known in the art, can be used as appropriate to fabricate multiplexed gratings.

In many embodiments, the waveguide can incorporate at least one of: angle multiplexed gratings, color multiplexed gratings, fold gratings, dual interaction gratings, rolled K-vector gratings, crossed fold gratings, tessellated gratings, chirped gratings, gratings with spatially varying refractive index modulation, gratings having spatially varying grating thickness, gratings having spatially varying average refractive index, gratings with spatially varying refractive index modulation tensors, and gratings having spatially varying average refractive index tensors. In some embodiments, the waveguide can incorporate at least one of: a half wave plate, a quarter wave plate, an anti-reflection coating, a beam splitting layer, an alignment layer, a photochromic back layer for glare reduction, and louvre films for glare reduction. In several embodiments, the waveguide can support gratings providing separate optical paths for different polarizations. In various embodiments, the waveguide can support gratings providing separate optical paths for different spectral bandwidths. In a number of embodiments, the gratings can be HPDLC gratings, switching gratings recorded in HPDLC (such switchable Bragg Gratings), Bragg gratings recorded in holographic photopolymer, or surface relief gratings. In many embodiments, the waveguide operates in a monochrome band. In some embodiments, the waveguide operates in the green band. In several embodiments, waveguide layers operating in different spectral bands such as red, green, and blue (RGB) can be stacked to provide a three-layer waveguiding structure. In further embodiments, the layers are stacked with air gaps between the waveguide layers. In various embodiments, the waveguide layers operate in broader bands such as blue-green and green-red to provide two-waveguide layer solutions. In other embodiments, the gratings are color multiplexed to reduce the number of grating layers. Various types of gratings can be implemented. In some embodiments, at least one grating in each layer is a switchable grating.

Waveguides incorporating optical structures such as those discussed above can be implemented in a variety of different applications, including but not limited to waveguide displays. In various embodiments, the waveguide display is implemented with an eyebox of greater than 10 mm with an eye relief greater than 25 mm. In some embodiments, the waveguide display includes a waveguide with a thickness between 2.0-5.0 mm. In many embodiments, the waveguide display can provide an image field-of-view of at least 50° diagonal. In further embodiments, the waveguide display can provide an image field-of-view of at least 70° diagonal. The waveguide display can employ many different types of picture generation units (PGUs). In several embodiments, the PGU can be a reflective or transmissive spatial light modulator such as a liquid crystal on Silicon (LCoS) panel or a micro electromechanical system (MEMS) panel. In a number of embodiments, the PGU can be an emissive device such as an organic light emitting diode (OLED) panel. In some embodiments, an OLED display can have a luminance greater than 4000 nits and a resolution of 4 k×4 k pixels. In several embodiments, the waveguide can have an optical efficiency greater than 10% such that a greater than 400 nit image luminance can be provided using an OLED display of luminance 4000 nits. Waveguides implementing P-diffracting gratings (i.e., gratings with high efficiency for P-polarized light) typically have a waveguide efficiency of 5%-6.2%. Since P-diffracting or S-diffracting gratings can waste half of the light from an unpolarized source such as an OLED panel, many embodiments are directed towards waveguides capable of providing both S-diffracting and P-diffracting gratings to allow for an increase in the efficiency of the waveguide by up to a factor of two. In some embodiments, the S-diffracting and P-diffracting gratings are implemented in separate overlapping grating layers. Alternatively, a single grating can, under certain conditions, provide high efficiency for both p-polarized and s-polarized light. In several embodiments, the waveguide includes Bragg-like gratings produced by extracting LC from HPDLC gratings, such as those described above, to enable high S and P diffraction efficiency over certain wavelength and angle ranges for suitably chosen values of grating thickness (typically, in the range 2-5 µm). Examples of waveguide based display devices are discussed in US Pat. Pub. No. 2018/0284440, entitled "Waveguide Display" and filed Mar. 30, 2018 which is hereby incorporated by reference in its entirety.

Waveguides Incorporating Protective Layers

Waveguides and waveguide displays can include protective layers in accordance with various embodiments of the invention. In many embodiments, the waveguide or waveguide display incorporates at least one protective layer. In further embodiments, the waveguide or waveguide display incorporates two protective layers, with one on each side of the device. As discussed in the sections above, waveguides and waveguide displays can be constructed with transparent substrates that, through their air interfaces, provide a TIR light guiding structure. In those cases, the protective layer can be implemented and incorporated such that there is minimal disruption to the substrates' air interfaces. In some embodiments, the protective layer can by virtue of its material properties and/or method of deposition onto a waveguide substrate, compensate for surface defects in the substrate, such as not limited to a surface ripple, scratches, and other nonuniformities that cause the surface geometry to deviate from perfect planarity (or other desired surface geometries). Protective layers can be implemented in various thicknesses, geometries, and sizes. For example, thicker protective layers can be utilized for applications that require more durable waveguides. In many embodiments, the protective layer is sized and shaped similar to the waveguide in which it is incorporated. For curved waveguides, the protective layer can also be curved. In further embodiments, the protective layer is curved with a similar curvature as the waveguide. Protective layers in accordance with various embodiments of the invention can be made of various materials. As can readily be appreciated, the properties of the protective layer, including but not limited to thicknesses, shapes and material compositions, can be selected based on the specific requirements of a given application. For example, protective layers can be implemented to provide structural support for various applications. In such cases, the protective layer can be made of a robust material, such as but not limited to plastics and other polymers. Depending on the application, the protective layer can also be made of glass, silica, soda lime glass, polymethyl methacrylate (PMMA), polystyrene, polyethylene, and other plastics/polymers.

In some embodiments, the protective layer can be incorporated using spacers to provide and maintain an air gap between the waveguide's substrates and the protective layers. Such spacers can be implemented similarly to those described in the sections above. For instance, a suspension of spacers and acetone can be sprayed onto the outer surface of the waveguide. In many cases, it is desirable to uniformly spray the suspension. The acetone can evaporate, leaving behind the spacers. The protective layer (which has had glue/adhesive/sealant/etc. added at the edges) can then be placed and vacuumed down into contact with the spacers. Although in some applications the spacers may move a small amount, they generally stay in place due to van der Waals forces. The spacers can be made of any of a variety of materials, including but not limited to plastics (e.g., divinylbenzene), silica, and conductive materials. In several embodiments, the material of the spacers is selected such that its refractive index does not substantially affect the propagation of light within the waveguide cell. The spacers can take any suitable geometry, including but not limited to rods and spheres. Additionally, spacers of any suitable size can be utilized. For instance, in many cases, the sizes of the spacers range from 1 to 30 µm. As can readily be appreciated, the shape and size of the spacers utilized can depend on the specific requirements of a given application. In some cases, the protective layer may advantageously be disposed further away from the waveguide. In such embodiments, larger sized spacers can be utilized.

The incorporation of protective layers can be implemented with different waveguide configurations, including single and multi-layered waveguides. For example, multi-layered waveguides can incorporate two protective layers, one disposed near each of the outer surfaces. In addition to providing environmental isolation and structural support for the waveguide, the protective layers can also be implemented for a variety of other applications. In many embodiments, the protective layer allows for dimming and/or darkening. The protective layer can incorporate materials for photochromic or thermochromic capabilities. The protective layer can also be configured to allow for controllable dimming and/or darkening. In several embodiments, the protective layer implements electrochromic capabilities. The protective layer can also provide a surface for other films, including but not limited to anti-reflective coatings and absorption filters. Such films can be implemented to avoid seeing light from the outside. In many cases, such films cannot be directly placed onto the waveguide, which can be due to the required high temperature processes or disturbance to the waveguiding in general. In a number of embodiments, the protective layer provides optical power. In further embodiments, the protective layer provides variable, tunable optical power. Such focus tunable lenses can be implemented using fluidic lenses or SBGs. In some applications, a picture generation unit is implemented and, depending on the waveguide application and design, may require an unobstructed light path between the PGU and the waveguide as the protective layer could refract the input beam, leading to positional errors. In many cases, an incident beam will contain rays that are at an angle to the waveguiding substrates. These effects will be exacerbated as the incident ray angles increase. Even for an incident beam that will not be refracted, there are still potential issues as the material used in the protective layer can impact the polarization of the beam and introduce scatter. In such embodiments, the protective layer can be designed and shaped accordingly to prevent the protective layer's interference with the light path.

Eye Glow Suppression

A. Diffractive Elements.

Eye glow suppression may be implemented in a partially light blocking layer which may include diffractive elements. The diffractive elements may be a reflection grating. In many embodiments, at least one reflection grating is implemented and utilized within a waveguide display system for suppressing eye glow. Reflection gratings can be introduced on the environmental of a waveguide display to reflect eye glow beams back into the waveguide that would otherwise escape. In many embodiments, this reflection occurs at an angle that coincides with the angle of associated out-coupled light, preventing any distortion or ghost imaging from the perspective of the viewer. A waveguide display incorporating a reflection grating as an eye glow suppression structure in accordance with an embodiment of the invention is conceptually illustrated in FIG. 2. As shown, the system includes a waveguide 200 containing a grating layer 210 for providing in-coupling, propagation, and out-coupling of light. In the illustrative embodiment, the system includes a second waveguide 230 having a grating layer 240 with at least one reflection grating. The reflective grating layer 240 may include one or more holographic gratings sandwiched between two substrates similar to the gratings described above. In such configurations, the substrates of waveguides 200 and 230 are index-matched, forming a single TIR structure within which light can propagate. In the intended mode of operation for the first waveguide 200 as shown in area 250, a beam 252 traveling in a TIR path within the two waveguides 200, 230 can be out-coupled (254) towards a viewer by a grating within grating layer 210.

In contrast, area 260 illustrates an example of off-Bragg interactions that can cause eye glow. This example is not limiting and other causes of eye glow exist and are described above in connection with FIGS. 1A and 1B. As shown, ray 264 is a result of an off-Bragg interaction with a grating within grating layer 210 that originates from ray 262. Ray 264 passes through waveguide 200 and is incident upon a reflection grating within grating layer 230, where a portion of ray 264 is diffracted into the second waveguide 230. A light absorbing layer 270 may absorb the ray 264. The light absorbing layer 270 may absorb the eye-glow light diffracted by the diffractive element and block any outside light from being diffracted toward the light absorbing layer 270. The light absorbing layer 270 may be positioned in many places throughout the waveguide display such as toward the temple of the user with side-mounted projector or absorbing frame of glasses; toward the nose of the user; upward toward the projector mounting in top-down projector system; toward the edge of frame holding the waveguide; and toward other specific location with absorbing elements. The second waveguide 230 may include a thin substrate made of polycarbonate or glass. The thin substrate may be doped with a small amount (e.g. ~5% tint) of absorbing dye at a desired wavelength. In some embodiments, through TIR, the eyeglow light may have a long path through the second waveguide 230 effectively absorbing all the light. Environmental light may have a short path through the second waveguide 230 but be left unchanged during transmission through the waveguide 230. In many embodiments, a small portion of the eye glow ray is not passed due to small errors in, or physical limitations of, the reflection grating layer 240 and continues on through waveguide 230 and manifests as eye glow. However, these rays are significantly weaker than typical unmitigated eye glow rays.

Figure 2:
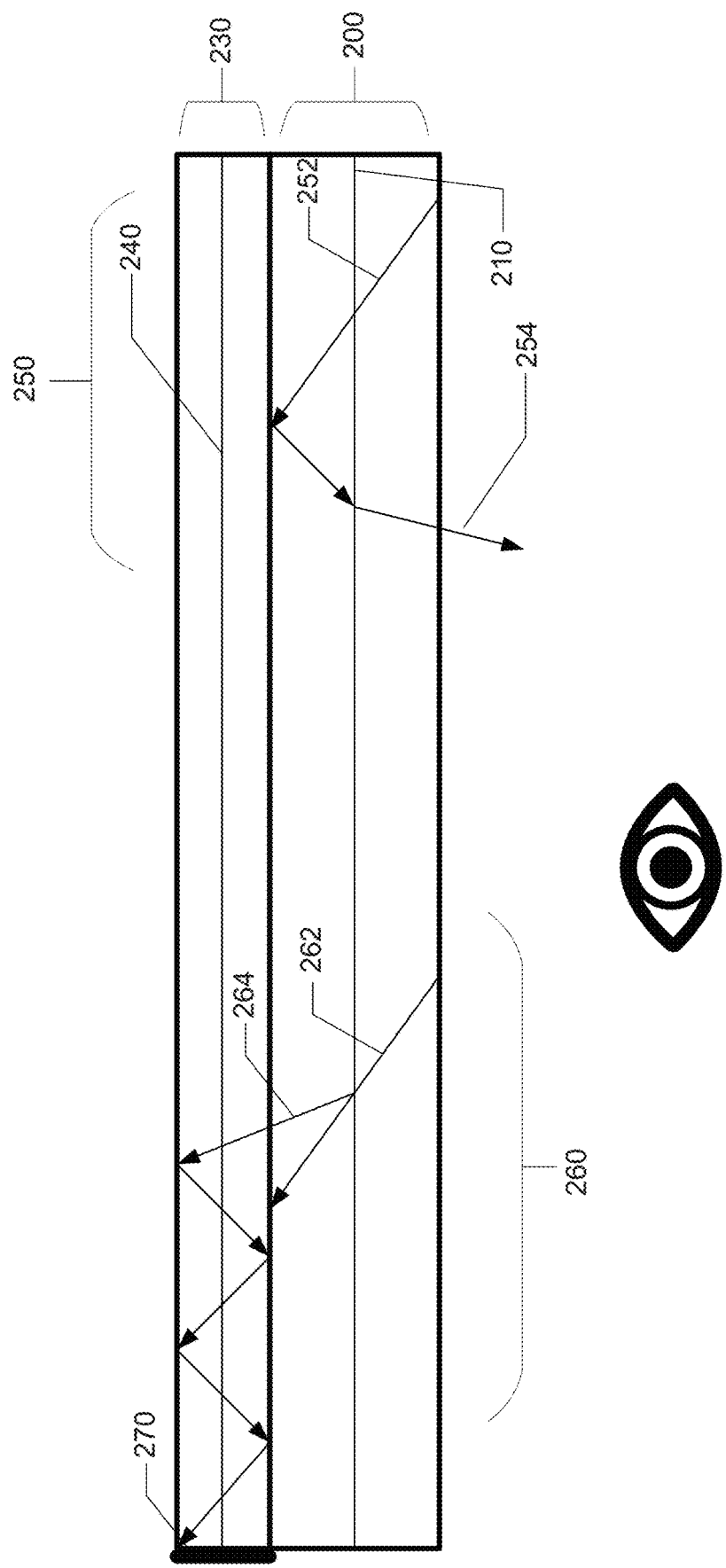
FIG. 2 illustrates a waveguide display incorporating diffractive elements as an eye glow suppression layer in accordance with an embodiment of the invention.
Figure 3A:
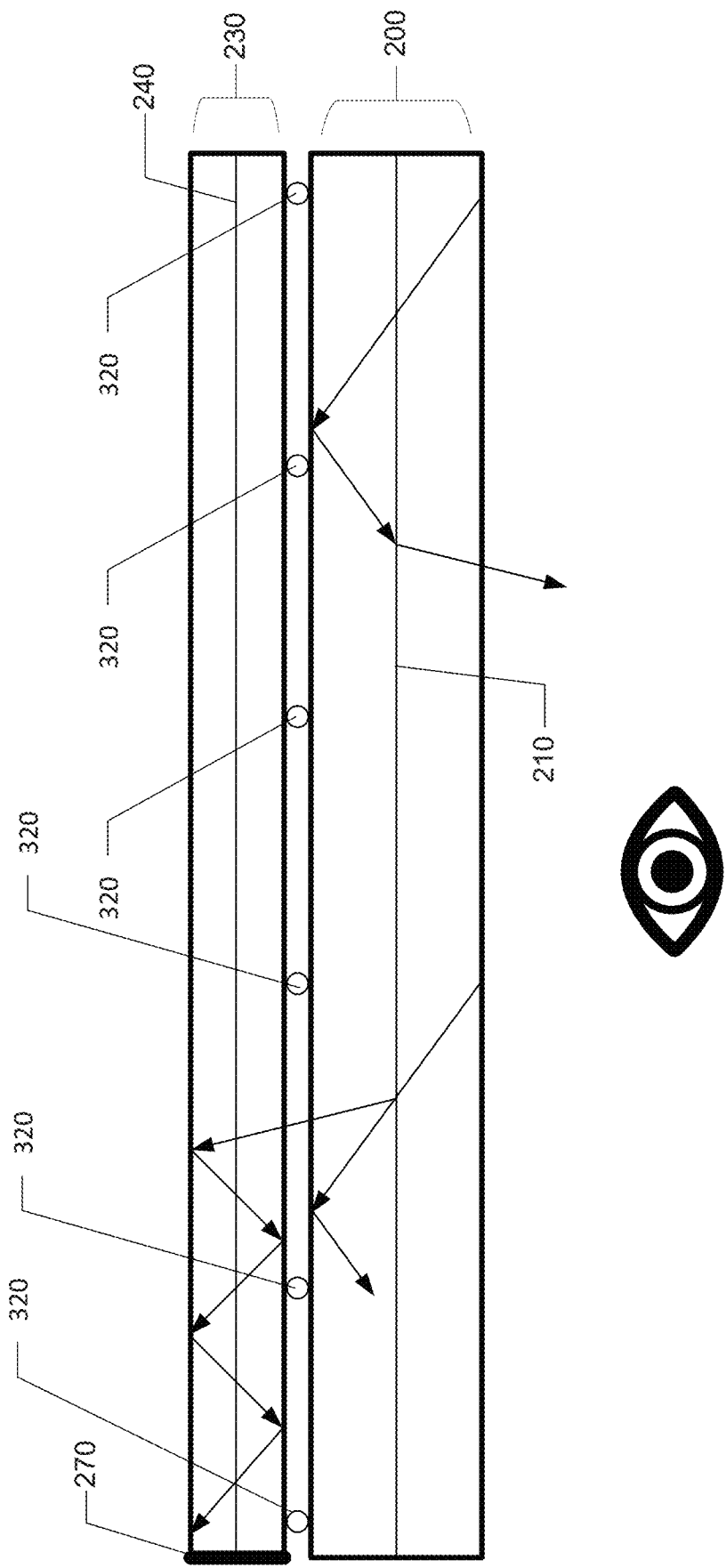
FIG. 3A illustrates a waveguide display incorporating diffractive elements in an eye glow suppression layer in accordance with an embodiment of the invention.

Although FIG. 2 illustrates a specific configuration of a waveguide display implementing a reflection grating for eye glow suppression, many other configurations can be implemented as appropriate depending on the specific requirements of a given application. For example, in the embodiment of FIG. 2, the waveguide containing the reflection grating is of the same size and shape as the base waveguide. In other embodiments, the waveguide containing the reflection grating is smaller than the base waveguide, covering a predetermined portion of the gratings within the base waveguide. Additionally, reflection waveguides do not need to be positioned such that they are touching the base waveguide. In numerous embodiments, there is a gap between the reflection and base waveguides. In many embodiments, the gap is air-filled, but can be filled with any material, such as but not limited to index-matching materials, as appropriate to the requirements of specific applications of embodiments of the invention. A reflection grating eye glow suppression structure with an air gap in accordance with an embodiment of the invention is illustrated in FIG. 3A. As shown, the waveguide 230 containing the reflection grating 240 is separated from the base waveguide 200 with an air gap through the use of spacer beads 320. In such embodiments, TIR paths of the main light rays are confined to the base waveguide 310.

Figure 3B:
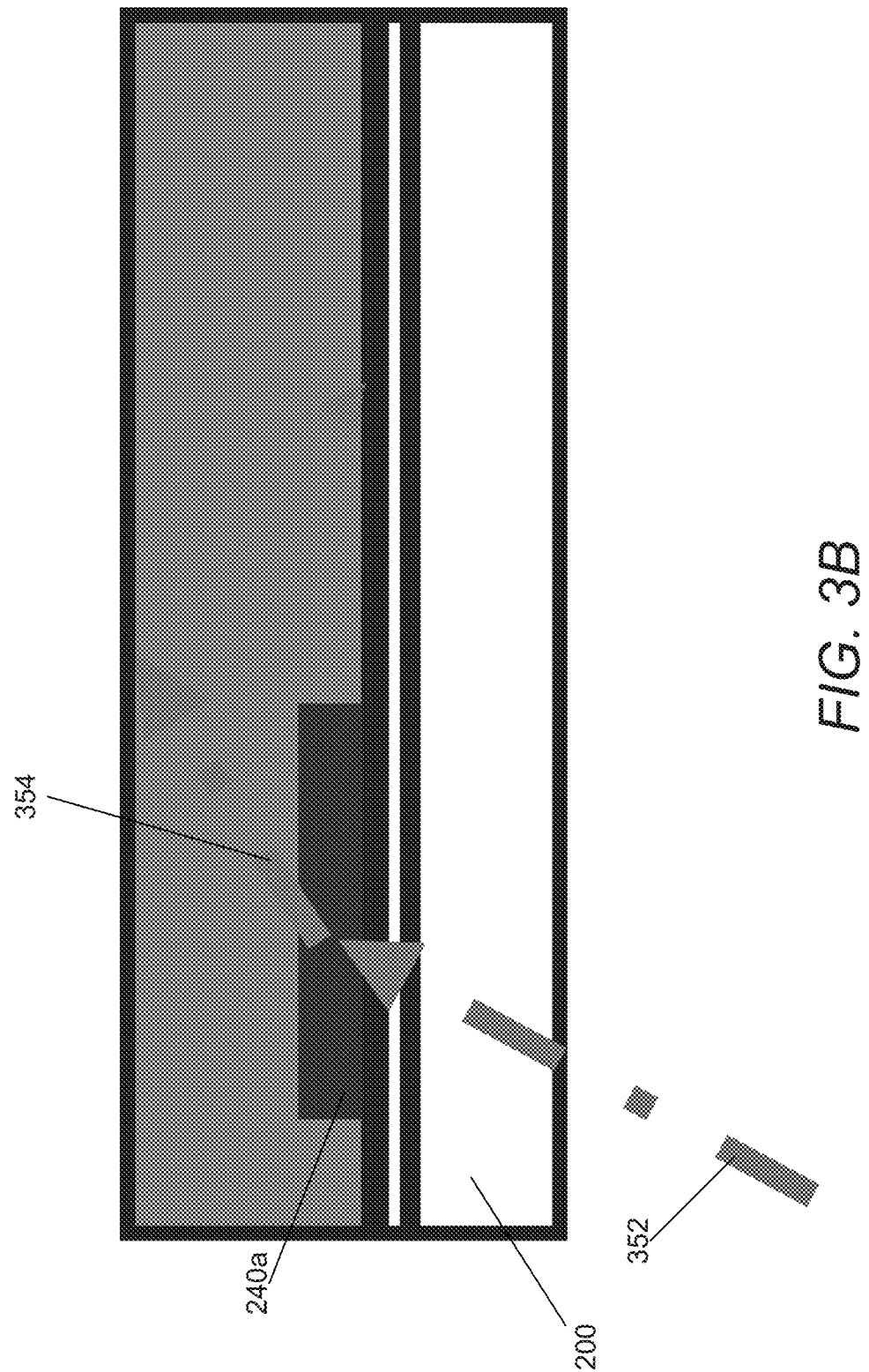
FIG. 3B illustrates an example of an eye glow suppression layer including transmission diffractive elements in accordance with an embodiment of the invention.
Figure 3C:
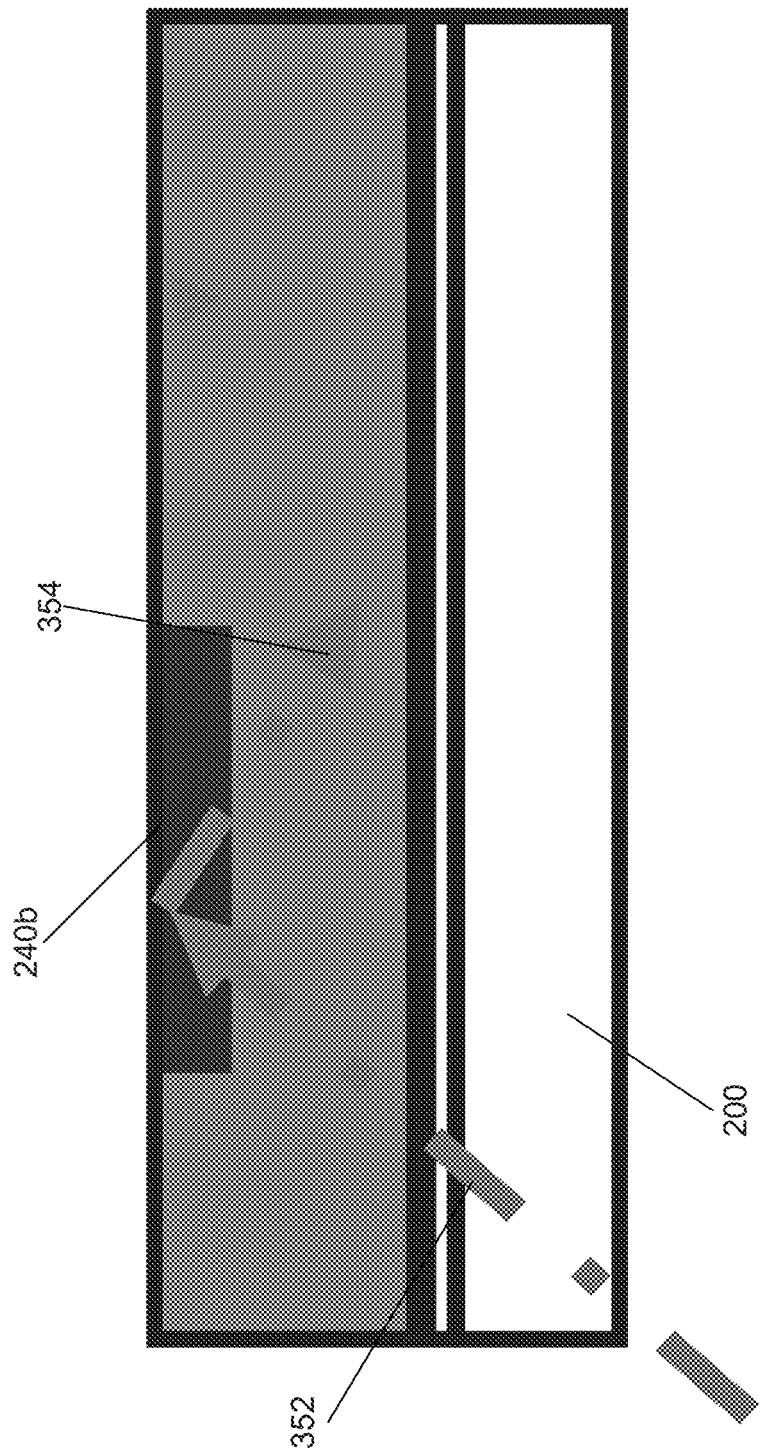
FIG. 3C illustrates an example of an eye glow suppression layer including reflective diffractive elements in accordance with an embodiment of the invention.

In some embodiments, the reflection grating 240 may be a transmission diffractive element which may in-couple light into the waveguide through transmission diffraction. FIG. 3B illustrates an example of the diffractive elements as transmission diffractive elements in accordance with an embodiment of the invention. As illustrated, the transmission diffractive element 240a in-couples inbound light 352 into the waveguide through transmission diffraction. The in-coupled light 354 travels in total internal reflection through the waveguide. In some embodiments, the reflection grating 240 may be a reflective diffractive element which may in-couple light into the waveguide through reflective diffraction. FIG. 3C illustrates an example of the diffractive elements as reflective diffractive elements in accordance with an embodiment of the invention. As illustrated, the reflective diffractive element 240b in-couples inbound light 352 into the waveguide through reflective diffraction. The in-coupled light 354 travels in total internal reflection through the waveguide.

In some embodiments, the reflection grating 240 may be a polymer grating structure. The polymer grating structure can be configured in many different ways depending on the waveguide regions and optical paths contributing to eye glow. The principal waveguide regions and optical paths may be determined using ray tracing techniques. In many embodiments, the polymer grating structure may be configured such that it at least partially overlaps at least one of the input coupler and the gratings for providing beam expansion and extracting light from the waveguide. The reflection grating 240 may be formed on at least one of the external surface of the waveguide (as illustrated in FIG. 2 and FIGS. 3A-3C) and the eye-facing surface of the waveguide (as described below).

In some embodiments, the reflection grating 240 may also be formed between the substrates of the waveguide 200 such that the reflection grating 240 is formed as a portion of the grating layer 210 of the waveguide 200. In some embodiments, a portion of the reflection grating 240 may be used as the input coupler to couple image modulated light from the source into a total reflection internal path in the waveguide 200. In some embodiments, a portion of the reflection grating 240 may be used as the output coupler configured to outcouple light from the waveguide 200. In some embodiments, a portion of the reflection grating 240 may be used as the fold grating configured as a beam expander. In some embodiments, the input coupler may be a grating or a prism.

Figure 4:
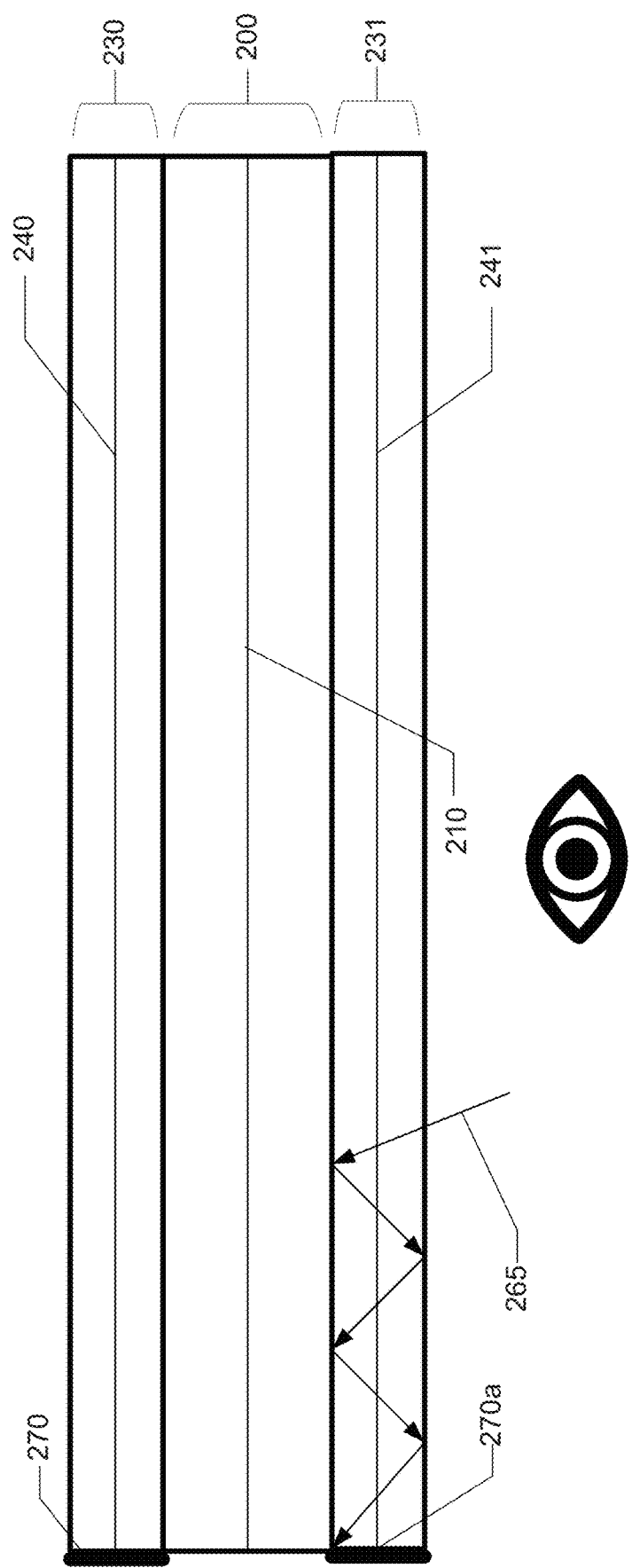
FIG. 4 schematically illustrates a waveguide display incorporating a reflection grating as an eye glow suppression structure in accordance with an embodiment of the invention is conceptually.

FIG. 4 schematically illustrates a waveguide display incorporating a reflection grating as an eye glow suppression structure in accordance with an embodiment of the invention is conceptually. FIG. 4 includes many identically labeled elements from FIG. 2 which function similarly to FIG. 2. The description from FIG. 2 is applicable to the waveguide display of FIG. 4 and this description will not be repeated in detail. As illustrated, a waveguide 200 may be located between a top grating 240 and a bottom grating 241. In some embodiments, the top grating 240 and the bottom grating 241 may have different grating periods. Eyeglow contributing rays incident on the top grating 240 and the bottom grating 241 may originate from different sources and may have followed different waveguide ray paths and thus, the top grating 240 and the bottom grating 241 may include different diffracting prescriptions to deflect them away from eyeglow paths. In some embodiments, the top grating 240 and the bottom grating 241 may include different prescriptions that may differ not only in terms of their periods but may also include different grating modulations. For example, the bottom grating 241 may include a prescription for diffracting incident light (e.g. originating at an external light source) entering the waveguide via its top surface that is at a relatively small angle to the normal of the bottom grating 241 into a much larger angle towards the light absorber 270a.

The top grating 240 and/or the bottom grating 241 may be a polymer grating structure. In the illustrative embodiment, the system includes a waveguide 230a having housing the bottom grating 241. The bottom grating 241 may include one or more holographic gratings sandwiched between two substrates similar to the gratings described above. The substrates of waveguides 200 and 231 may be index-matched, forming a single TIR structure within which light can propagate.

A light absorbing layer 270a may absorb the ray 265. The light absorbing layer 270a may absorb the eye-glow light 265 diffracted by the diffractive element and block any outside light from being diffracted toward the light absorbing layer 270a. The light absorbing layer 270a may be positioned in many places throughout the waveguide display such as toward the temple of the user with side-mounted projector or absorbing frame of glasses; toward the nose of the user; upward toward the projector mounting in top-down projector system; toward the edge of frame holding the waveguide; and toward other specific location with absorbing elements. The waveguide 231 may include a thin substrate made of polycarbonate or glass. The thin substrate may be doped with a small amount (e.g. ~5% tint) of absorbing dye at a desired wavelength. In some embodiments, through TIR, the eye-glow light may have a long path through the waveguide 231 effectively absorbing all the light.

In some embodiments, the top grating 240 and the bottom grating 241 may be a combination of Bragg grating and Raman-Nath grating. In some embodiments, the top grating 240 and/or the bottom grating 241 may include a Bragg grating in some regions and a Raman-Nath grating in other regions. Depending on the nature of the beam-grating interactions within the waveguide, each of the input, fold and gratings may have regions that overlaps with the Bragg grating or Raman-Nath grating. In many embodiments, the two types of gratings may be interspersed across the top grating 240 and/or the bottom grating 241. For example, a fold grating in the waveguide 200 may be overlapped by Bragg gratings in some regions of the fold grating and Raman-Nath gratings in other regions. Any of the main imaging gratings (e.g. the input grating, the fold grating and the output grating) may be at least partially covered by at least one selected from a Bragg grating region, a Raman-Nath grating region and a region containing no grating. For example, the top grating 240 and/or the bottom grating 241 may include a Bragg grating region, a Raman-Nath grating region and/or a region containing no grating each of which may overlap portions of a fold grating due to the complex ray paths and grating interactions. The regions containing no grating may play a role in light management as they support eyeglow suppression layers of the types described below.

While FIG. 4 illustrates both a top grating 240 and a bottom grating 241, embodiments including just the top grating 240 (as illustrated in FIG. 2) or just the bottom grating 241 (not illustrated) are also disclosed. In some embodiments, the top grating 240 and/or the bottom grating 241 may be formed on a separate substrate which may include air separating the top grating 240 and/or the bottom grating 241 from the waveguide 200 used to propagate image light towards the eyebox. Examples of this are discussed in connection with FIG. 3A.

In many embodiments, the top grating 240 and/or the bottom grating 241 may include regions including a Bragg grating, a Raman-Nath grating, or no grating. Any one of the three types of regions may at least partially cover at least one of an input grating, a fold grating and an output grating. In many embodiments, a light control coating may be applied to regions of the top grating 240 and/or the bottom grating 241 containing no grating. Many different types of light control coatings may be used to assist with eyeglow management. In some embodiments, the light control coating may provide at least one optical function selected from the group of polarization rotation, polarization-selective absorption, polarization-selective transmission, polarization-selective diffraction, angle-selective transmission, angle selective absorption, anti-reflectivity, and/or transmission within a defined spectral bandwidth. In some embodiments, the light control coating may provide spatial variation of the above example optical functions.

In many embodiments, the top grating 240 and/or the bottom grating 241 may include a rolled K-vector grating based on either continuously varying or piecewise varying slant angles. In many embodiments, the top grating 240 and/or the bottom grating 241 may include a grating with spatially varying pitch. In many embodiments, the top grating 240 and/or the bottom grating 241 may be configured as multiplexed gratings.

In many embodiments, light 265 entering the waveguide 200 from the outside world may include sunlight or room lighting entering the waveguide 200 via the top surface (e.g. the world side of the waveguide) or via the bottom surface (e.g. eye facing surface) of the waveguide 200. Other sources of light 265 that potentially cause eyeglow may include car headlights and laser sources. In many embodiments, light from external sources may reflect off the eye of a viewer of the display after propagating through the waveguide. In many embodiments, image light reflected off an anatomical surface such as an eye surface may contribute to eyeglow. In some embodiments, the light entering the waveguide 200 from the outside world is provided by an external light source and enters the waveguide 200 though the external surface and/or the eye-facing surface of the waveguide which may contribute to eyeglow.

In some embodiments, the top grating 240 and/or the bottom grating 241 may be a holographic reflection grating. The holographic reflection gratings may be Bragg gratings and manufactured through holographic exposure as discussed above. In some embodiments, the holographic reflection gratings may be EBGs and manufactured in processes discussed above. EBGs may be useful in producing deep SRGs which may be Bragg gratings which may include a modulation depth and a grating pitch, where the modulation depth is greater than the grating pitch across at least a portion of the polymer grating structure. In some embodiments, EBGs may be configured as a Raman-Nath grating which acts in the Raman-Nath diffraction regime. The Raman-Nath grating may have a modulation depth less than the grating pitch across at least a portion of the polymer grating structure. The EBG may be an evacuated periodic grating configured to act in the Raman-Nath regime and have a modulation depth smaller that the grating pitch in the region. Such a grating does not strictly in the Bragg regime. By controlling the manufacturing process, EBGs may be useful in manufacturing gratings which include regions that act in the Bragg regime, regions that act in the Raman-Nath regime, and/or regions with no gratings.

In many embodiments, the polymer grating structure modulation depth may vary across the top grating 240 and/or the bottom grating 241 to provide a spatially varying polarization-dependent diffraction efficiency characteristic according to principles discussed in US Pat. Pub. No. 2021/0063634 which has been incorporated by reference in its entirety above. In many embodiments, the polymer grating structure modulation depth may vary across the top grating 240 and/or the bottom grating 241 to provide a spatially varying angle-dependent diffraction efficiency characteristic or a spatially varying polarization dependent diffraction efficiency characteristic. When the top grating 240 and/or the bottom grating 241 incorporate EBGs, at least one of the spatial, angular, or polarization diffraction efficiency characteristics of the EBGs may be tailored by backfilling the EBGs with an optical material of specified refractive index and/or birefringence. In some embodiments, the backfilling material may be an isotropic material such as a birefringent material. The backfill material may occupy a space at a bottom portion of the space between adjacent portions of the polymer grating structure and the air occupies the space from above the top surface of the backfill material to the modulation depth.

In some embodiments, the ratio of the modulation depth of the polymer grating structure to the grating pitch spacing lies in the range from 1:1 to 10:1. In some embodiments, the grating pitch of the polymer grating structure is 0.35 μm to 1 μm and the modulation depth of the polymer grating structure is 1 μm to 10 μm. The grating pitch may be the spacing of diffractive features of the polymer grating structure and the modulation depth may be the depth of the polymer grating structure. The polymer grating structure may have a modulation depth greater than a wavelength of visible light.

In many embodiments, the top grating 240 and/or the bottom grating 241 may include a polymer grating structure including a composite structure. The composite structure may include at least one type of polymer and at least one another material. In many embodiments, the polymer grating structure may be a composite of a polymer and at least one other material, where the polymer is removed after formation of the grating. In many embodiments, the at least one other material may be nanoparticles. In many embodiments, the nanoparticles may be functionalized nanoparticles. Gratings including nanoparticles are described in PCT App. No. PCT/US2021/041673, entitled "Nanoparticle-Based Holographic Photopolymer Materials and Related Applications" and filed Jul. 14, 2021, which is hereby incorporated by reference in its entirety for all purposes.

In some embodiments, the top grating 240 and/or the bottom grating 241 may include a two-dimensional lattice structure or a three-dimensional lattice structure. The two-dimensional lattice structure may be a 2D photonic crystal. An example of a 2D lattice may be an array of diffracting columns with bases lying on a plane. The three-dimensional lattice structure may be a 3D photonic crystal. The 3D lattice may include diffractive point-like regions.

In many embodiments, the top grating 240 and/or the bottom grating 241 may be coated with an optical material. In many embodiments, the top grating 240 and/or the bottom grating 241 may be coated with a reflective optical material. In many embodiments, the top grating 240 and/or the bottom grating 241 may be applied with a coating with an effective index up to 2.5. In many embodiments, the top grating 240 and/or the bottom grating 241 may be coated with a first material and the coated grating may be backfilled with a second material of refractive index higher than the refractive index of the first material. In many embodiments, the top grating 240 and/or the bottom grating 241 may be coated with a first material and the coated grating may be backfilled with a second material of refractive index lower than the refractive index of the first material.

In some embodiments, the top grating 240 and/or the bottom grating 241 includes polymer diffracting features and a birefringent material between adjacent polymer diffracting features, wherein the birefringent material has a higher refractive index than the polymer diffracting features. In some embodiments, the refractive index difference between the polymer diffracting features and the birefringent material is 0.01 to 0.2. In some embodiments, the top grating 240 and/or the bottom grating 241 includes alternating polymer regions and air gap regions and the refractive index difference between the polymer regions and the air gap regions is in the range from 1.4 to 1.9. In some embodiments, the birefringent material is a liquid crystal material.

In many embodiments, a method for reducing eyeglow from a waveguide display may include the steps of:
  a) providing a source of image modulated light, a waveguide, an input coupler; and at least one grating for providing beam expansion and extracting light from the waveguide towards an eyebox;
  b) providing a polymer grating structure with a modulation depth greater than the grating pitch across at least a portion of the polymer grating structure;
  c) directing image modulated light into a total internal reflection path in the waveguide, beam expanding the light, and extracting it towards the eyebox;
  d) directing light propagating within the waveguide away from optical paths that are refracted through the external surface using the polymer grating structure; and
  e) diffracting light entering the waveguide from the outside world or stray light generated within the waveguide away from optical paths that are refracted through the external surface using the polymer grating structure.

In addition to holographic reflection gratings, other types of structures can be utilized to achieve a similar effect. For example, in some embodiments, the reflection grating 240 may be a surface relief reflection grating.

Figure 5:
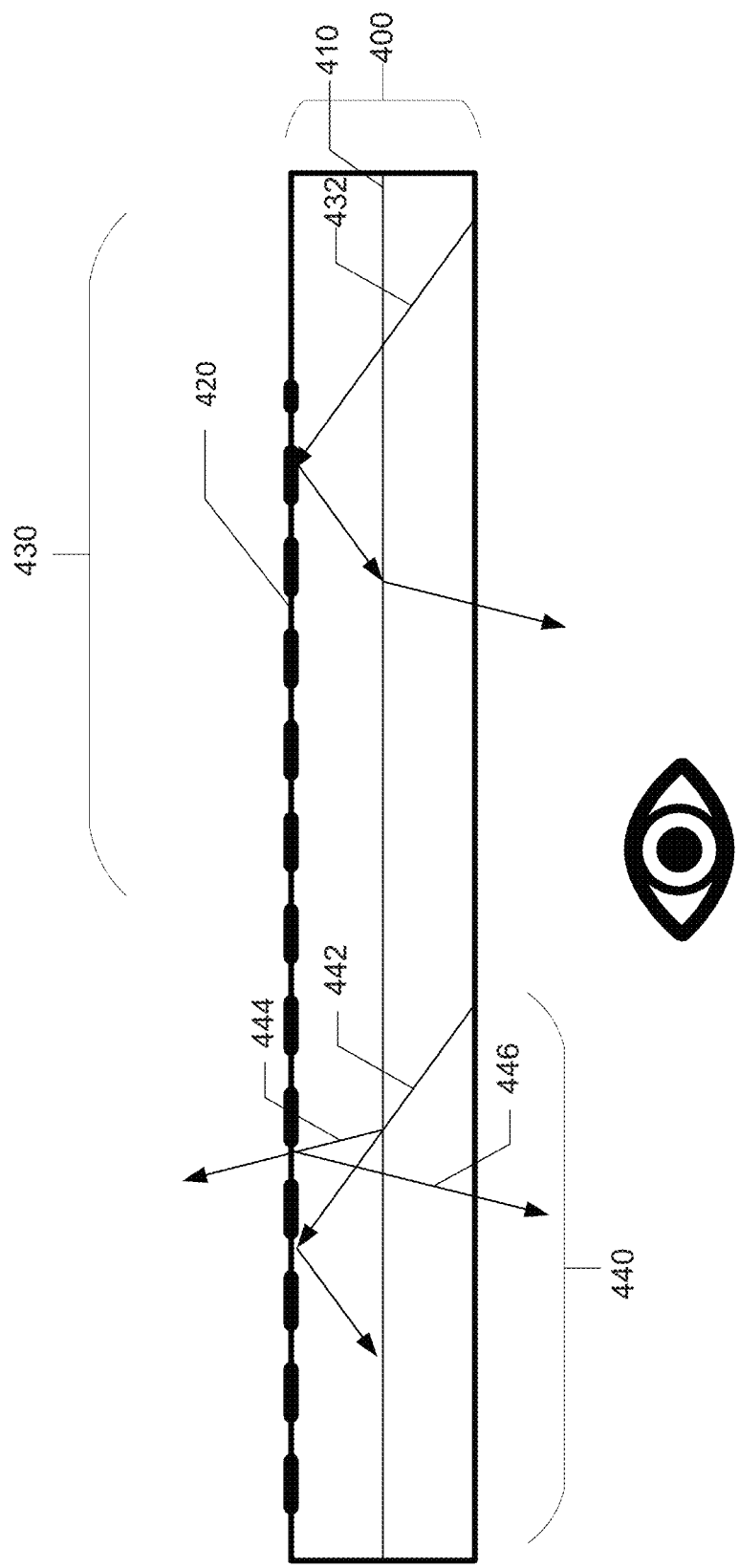
FIG. 5 illustrates a waveguide display implementing a surface relief grating for eye glow suppression in accordance with an embodiment of the invention.

In some embodiments, the reflection grating 240 can be etched directly onto the surface of the side opposite the eye side of the waveguide. A waveguide display implementing a surface relief grating for eye glow suppression in accordance with an embodiment of the invention is conceptually illustrated in FIG. 5. The waveguide 400 includes a grating layer 410 and a surface relief reflection grating 420 disposed on the surface of the environmental side of the waveguide 400. In the region 430 illustrating the intended operation of the waveguide display, ray 432 in a TIR path within the waveguide 400 is diffracted out to the eye side by an output grating within grating layer 410. In the area 440 illustrating off-Bragg interactions, a portion of ray 442 is diffracted as eye glow ray 444 towards the environmental side of the waveguide 400. The eye glow ray 444 can be reflected by the surface relief reflection grating 420 back towards the eye side as ray 446. In many embodiments, ray 446 is parallel to a corresponding normal output ray. Again, a portion of ray 446 may be reflected due to Fresnel reflection back towards the surface relief reflection grating, but in turn may be at least partially reflected by the surface relief reflection grating 420 (not illustrated). While rays are shown as passing through the reflection grating 420, in numerous embodiments, this does not occur. However, due to imperfections and/or physical limitations, it may occur regardless. In some embodiments, the surface relief reflection grating 420 mbe provided by a metasurface. A metasurface allows a greater degree of wavefront phase and amplitude control resulting from the use of nanometer-scale pitch diffracting features. Conventional diffractive optical elements such as Bragg gratings have diffractive features of micron scale pitch, i.e. diffractive feature pitches that are significant fractions of visible band wavelengths An advantage of surface relief reflection gratings is that they do not add significant volume to the display system. However, in numerous embodiments, the reflection gratings 240 described in connection with FIG. 2 can be placed on very thin substrates adjacent the waveguides with similar results. In some embodiments, the substrate can be disposed such that there is a gap between the substrate and the waveguide. The gap can be filled with any material, including (but not limited to) air.

Figure 6:
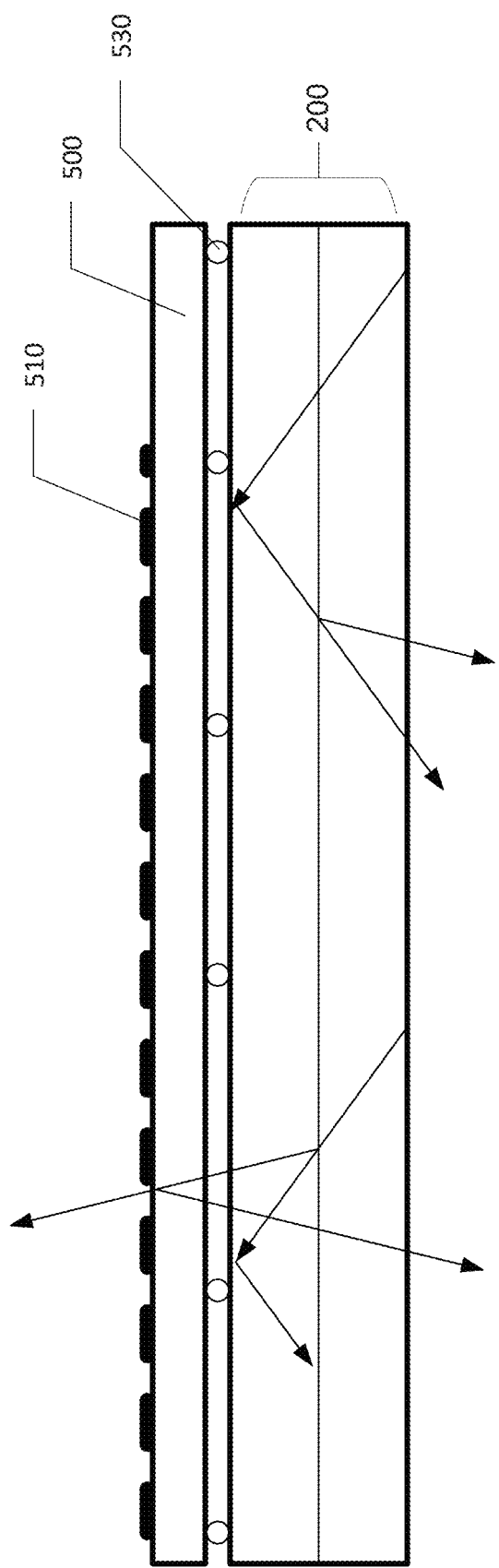
FIG. 6 illustrates a reflection grating disposed on a separate substrate for suppressing eye glow in accordance with an embodiment of the invention.

A reflection grating disposed on a separate substrate for suppressing eye glow in accordance with an embodiment of the invention is conceptually illustrated in FIG. 6. As shown, the waveguide 500 having a reflection grating 510 is separated with the base waveguide 200 using spacer beads 530. In the illustrative embodiment, the reflection grating 510 is disposed on the surface of the waveguide 500 facing the environmental side of the display. In other embodiments, the reflection grating 510 may be disposed on the surface facing the base waveguide 200.

While particular reflection waveguide eye glow suppression structures are illustrated in FIG. 2-6, any number and positioning of reflection waveguide optics can be used as appropriate to the requirements of specific applications of embodiments of the invention. Further, any number of different types of gratings can be added to suppress eye glow rays. For example, evacuated Bragg gratings can be used instead of surface relief gratings. Furthermore, non-grating structures can be used to suppress eye glow. These structures are described in further detail below.

B. Reflective Elements

In some embodiments, eye glow suppression may be implemented in a partial light blocking layer which may include reflective elements. The reflective elements may include the use of filters, such as but not limited to dichroic reflectors and dielectric mirrors, that can accurately selectively pass certain wavelength bands while reflecting others. Dielectric reflective coatings may be applied to reflect the eye-glow light back to the user. The reflective coating may be designed as a narrow notch filter around the illumination wavelengths, effectively reflecting only specific wavelengths while transmitting all other visible wavelengths, allowing the waveguides to appear nearly transparent with a high transmission. The reflective coating may act as a mirror for the designed wavelengths, reflecting the light with an angle equal to the angle incident to the reflective coating layer. However, the reflected light may create a ghost image to the user when overlayed with the desired image diffracted by the output grating. In some embodiments, a filter such as a dichroic filter may be designed to have an angle-dependent reflection or transmission efficiency. Such filters may be multi-layered structures. The filter may be designed with polarization-sensitive efficiencies. Using one or more of spectral, angular, or polarization filter characteristics may help to optimize the suppression of eye glow. In some embodiments, the eye glow suppression may balance a higher degree of eye glow suppression in the central portion of the user's field of view against residual eye glow at the periphery of the user's field of view.

The coating may be applied in various locations. For example, the coating may be applied on each waveguide individually, which may allow for larger angular deviations before ghosting is apparent. The coating may also be applied on a front protective cover. It has been observed that further distance from the user may create a larger deviation between desired image and ghost image. In some embodiments, the front protective cover may be spaced further from the waveguide hence offering a little more optical path. The added path length could be used to reduce coherence of artifacts such as Newton's Rings fringes in laser beam scanner (LBS) projectors. Advantageously, the reflection may be aligned to the eyeside 'signal' image. In some embodiments, the misalignment may be minimal which may be on the scale of the resolution of the image of the eye glow reflection vs the signal image; if misalignment does occur, this may lead to image point spread function broadening and hence loss of image sharpness, or if the reflection angle error is larger, then it will cause a ghost image. The coherence of the eye glow reflection may be considered in the case of laser illumination solutions, particularly with laser beam scanners (LBS). In some embodiments, a phase scrambler on the non-eye side of the waveguide may cause the Fresnel reflections to be out of phase with the signal light which may decrease the Newton's rings fringe artifacts which may be found with LBS projectors. The application of an 'eyeglow suppression' spectral notch reflection filter could increase the intensity of Newton's rings fringes from LBS, where LBS Newton's rings are caused by the interference of the signal beam and the non-eyeside reflection. In some embodiments, antireflection coatings on the non-eyeside may be included leading to a reduction in both eyeglow and LBS Newton's rings fringes.

In some embodiments, the protective cover may be plastic. In this case, when the reflective coating is applied to the protective cover the thermal property limitations during coating may be minimal. For example, if a grating was made using a thermally sensitive materials, then a low temperature coating (e.g. 50-60 degrees C.) might be beneficial. In embodiments where the protective cover is made of glass a high temperature coating may be used. A reflective coating may be applied to one side of the protective cover for one waveband (e.g. a green reflective notch), and another reflective coating may be applied to the other side coated with different waveband (e.g. a red/blue notch). It is appreciated that any combination of wavebands may be used (e.g. any other combination of R,G,B notches). The reflective coating may be combined with see thru AR, UV protection, gradient absorption or dimming coatings, anti-scratch or hard coat coatings.

It may be advantageous for the reflective layer to be flat and laminated to the waveguide to decrease angular offset from reflected eye-glow light and the desired image. In some embodiments, a material may provide flatness between layers (e.g. thickness shims, spacer beads, etc.). The reflective layer may be laminated to the waveguide or waveguide stack. In some embodiments, the reflective layer may be a narrow notch reflector designed for lasers which partially reduces LED eye glow when the notch lies within the spectrum of the LED.

Depending on construction, the reflective layer may pass a wide range of colors except for a specific band (or set of bands) which is reflected, or act as a high-pass or low-pass filter which reflect all wavelengths less than, or higher than, a given wavelength, respectively. In some embodiments, alternating thin layers of dielectric material is coated to form the desired filter. As described herein, dichroic reflectors or dielectric mirrors can be applied to waveguides to reflect eye glow rays in a manner which produces similar results as those described above with respect to reflection gratings, although with different underlying operating principles.

The waveguide 600 includes a dichroic reflector 610 on the surface facing the environmental side. The waveguide 600 may include a grating layer 602 which is the same as the grating layer 210 which was discussed in connection with FIG. 2. The dichroic reflector 610 may be designed to reflect a predetermined wavelength band of light that correspond to waveguide 600. For example, in a multi-layered waveguide display having three layers for R, G, and B, the dichroic reflector 610 for a given waveguide layer can be designed to reflect light in which the given waveguide layer is intended to operate (e.g., the dichroic reflector for the red waveguide can be designed to reflect a wavelength band corresponding to red light from the light source). Similar to a surface relief grating, the dichroic reflector 610 can reflect at least a portion of rays that would otherwise escape and manifest as eye glow back towards the viewer. Similar as to described above in connection with FIGS. 2-6, intended rays are shown in area 620, whereas eye glow rays generated by off-Bragg interactions and their suppression are shown in area 630. Again, while intended rays and eye glow rays are shown separately, it is readily appreciated that these rays occur concurrently throughout the waveguide.

When using dichroic reflectors, a percentage of environmental light that is able to pass through the waveguide display to the viewer's eyes may be diminished. Therefore, while eye glow rays are reflected back towards the eye, light from the outside world corresponding to similar wavelength bands can also be prevented from reaching the viewer's eyes. This may cause problems in augmented reality systems in which it may be desirable for the user to be able to see the world as clearly as possible. To address this, dichroic reflector structures may be designed as a notch filter which may selectively reflect the wavelength band that is used in the waveguide (e.g. the colors selected for the particular waveguide). For example, a narrow band can be selected around 638 nm, 520 nm, and 455 nm (standard display red, green, and blue, respectively) in order to suppress eye glow while keeping the remainder of the visible spectrum (e.g. 440-640 nm) unaffected. As can readily be appreciated, the selected band can correspond to the wavelength bands of the light source.

Further, dichroic reflectors are often applied at high temperatures which, depending on the construction of the waveguide and/or any antireflective coatings, may cause deformation to the waveguide. To avoid this, a lower temperature dichroic reflector application process can be used. In numerous embodiments, the dichroic reflector can be included in a protective layer of a waveguide.

Dichroic reflectors (or indeed, waveguides) can be applied in multiple iterations or as a single application depending on the needs of the overall system. For example, as described above, in an RGB display where three different waveguides are used for each of R, G, and B, a dichroic reflector (or reflection grating/reflection waveguide) can be interspersed between the three different waveguides or on the environmental side of the waveguide stack.

Figure 7:
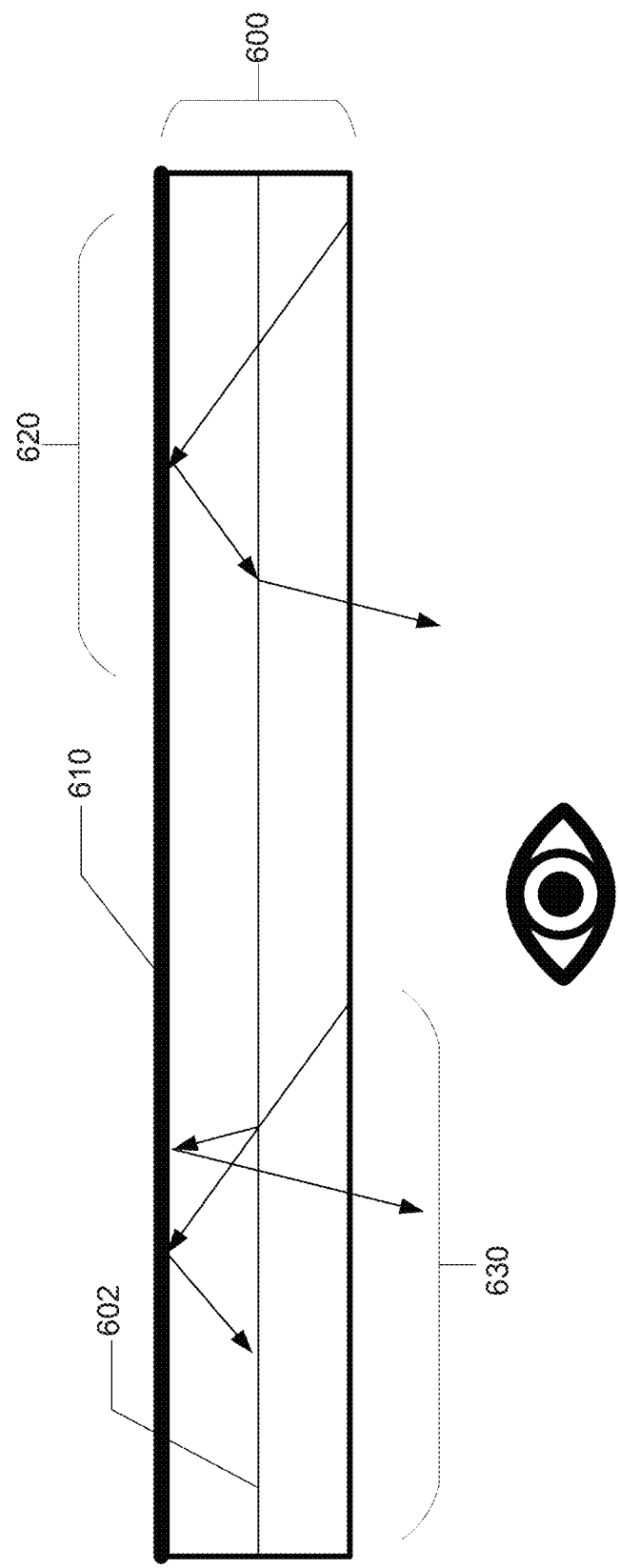
FIG. 7 illustrates a waveguide display including a dichroic reflector coating in accordance with an embodiment of the invention.
Figure 8:
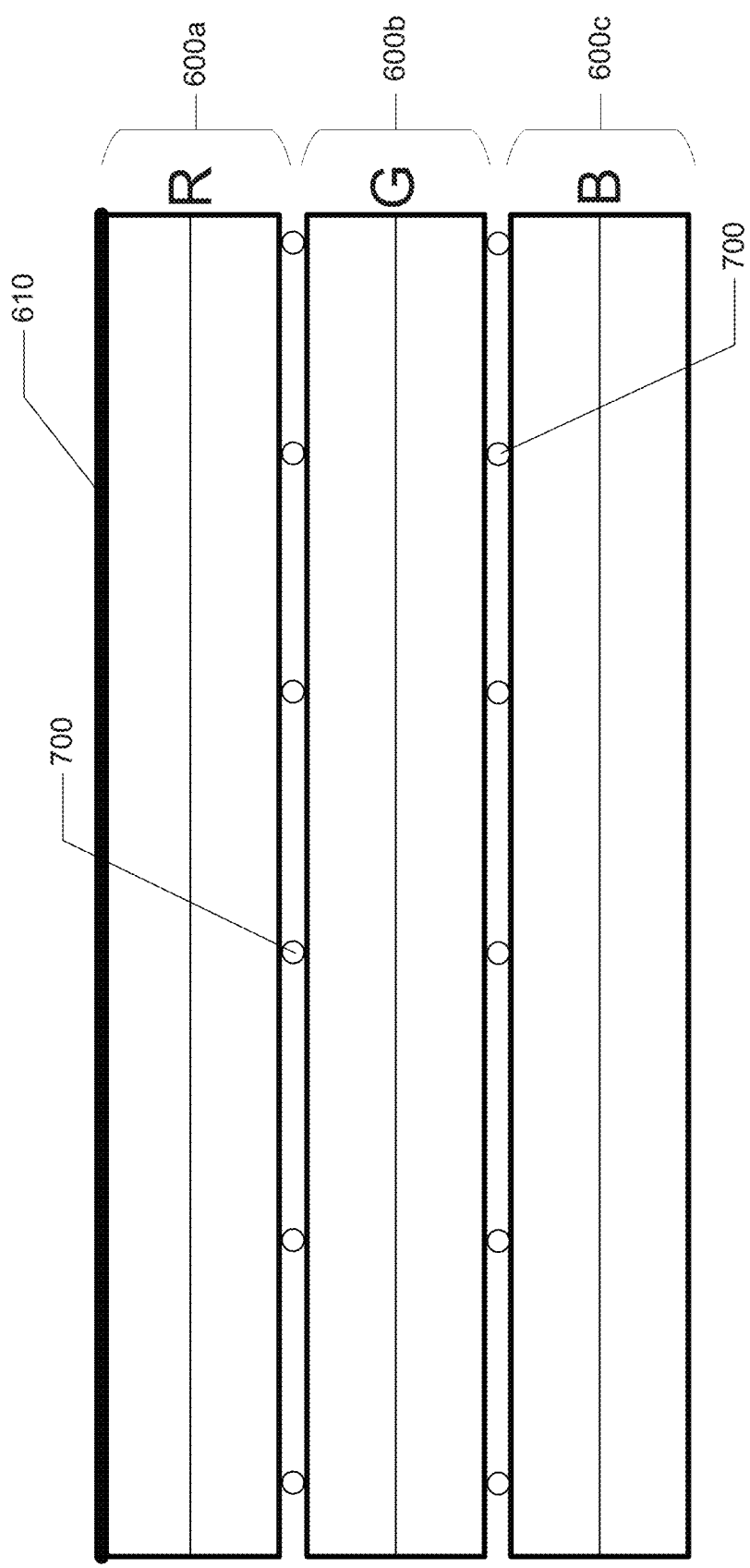
FIG. 8 illustrates a configuration of a waveguide-based display including three different waveguides in accordance with an embodiment of the invention.
Figure 9:
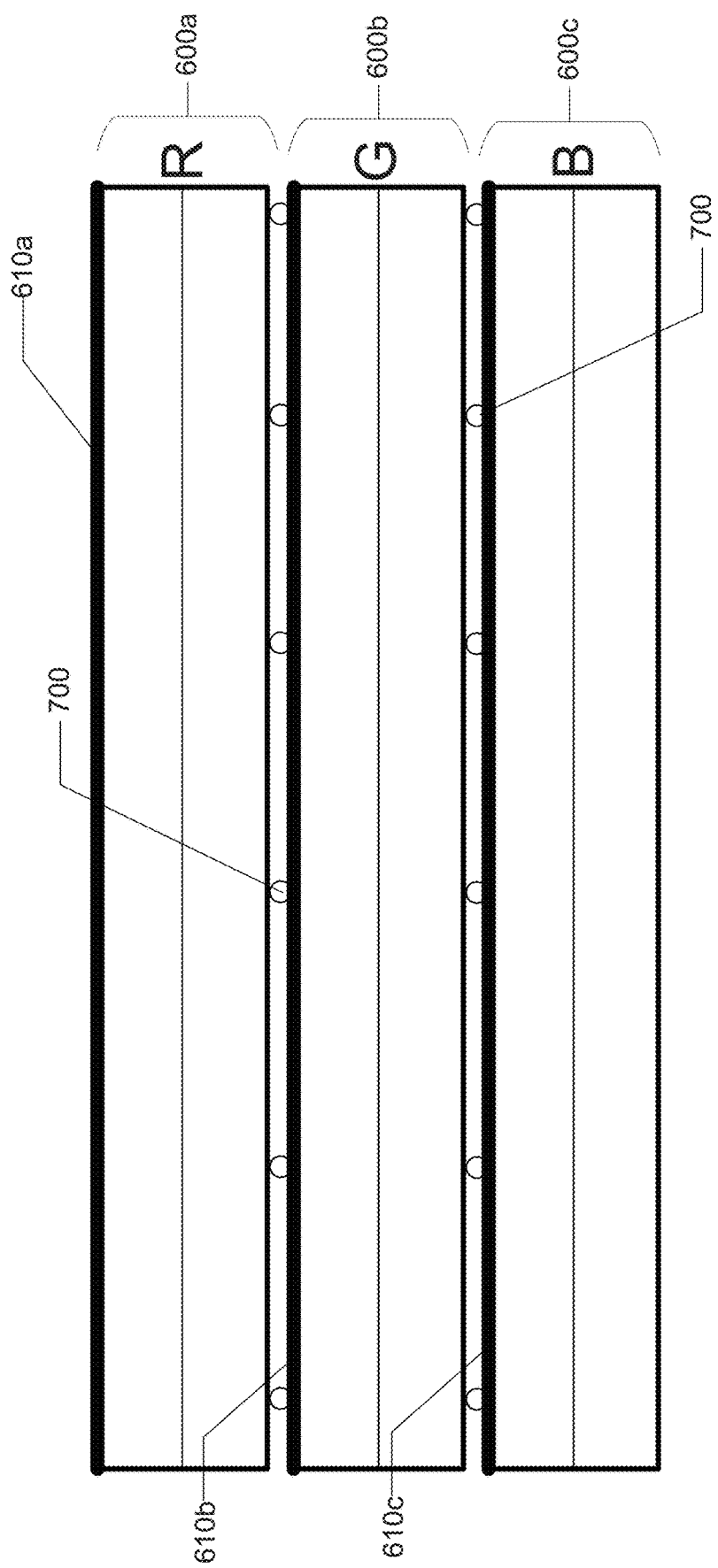
FIG. 9 illustrates a configuration of a waveguide-based display including three different waveguides in accordance with an embodiment of the invention.
Figure 10:
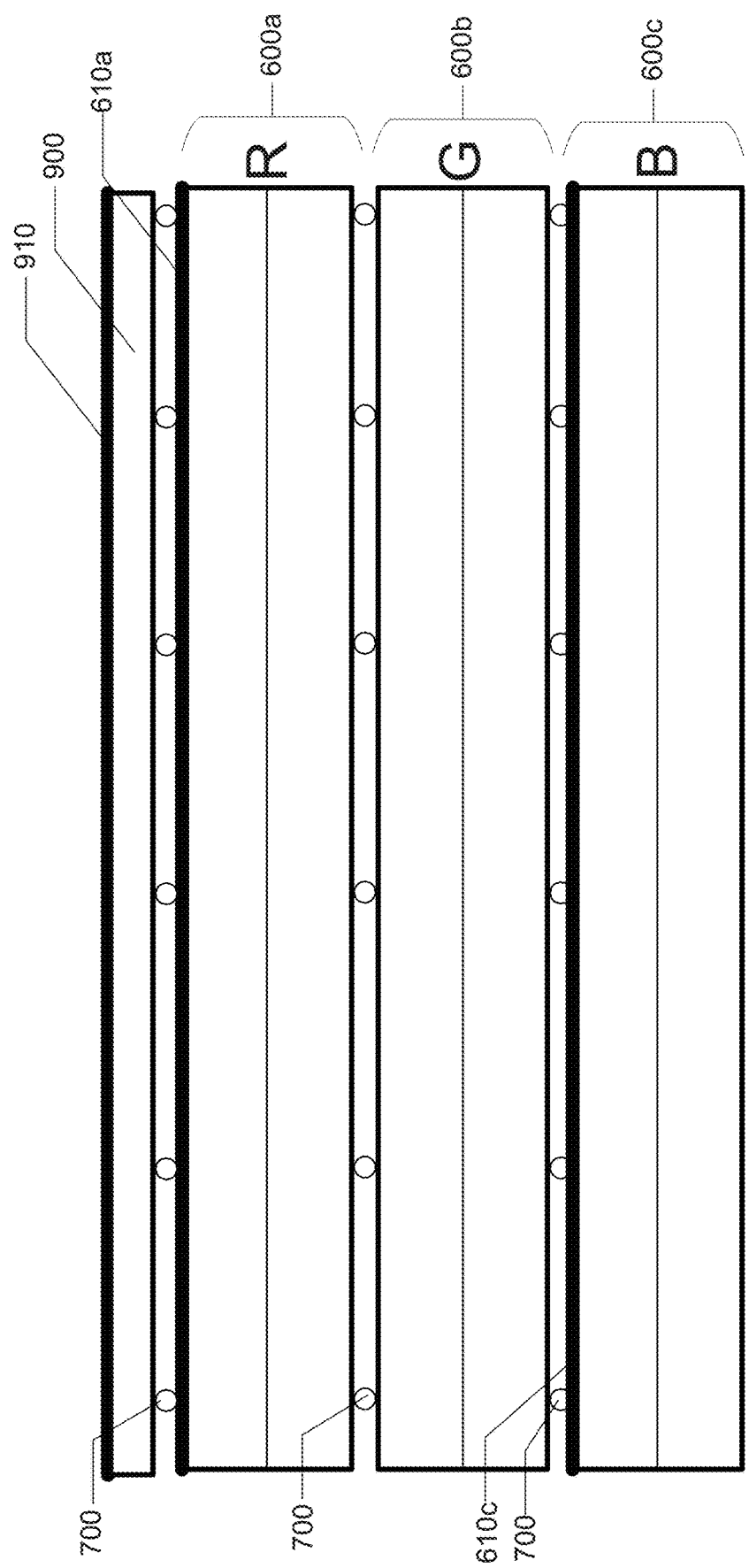
FIG. 10 illustrates a configuration of a waveguide-based display including three different waveguides in accordance with an embodiment of the invention.

Example configurations of dichroic reflector applications in accordance with embodiments of the invention are illustrated in FIGS. 8-10. FIG. 8 illustrates an example of a waveguide-based display including three different waveguides in accordance with an embodiment of the invention. A first waveguide 600a may be configured to display a first color such as red, a second waveguide 600b may be configured to display a second color such as green, and a third waveguide 600c may be configured to display a third color such as blue. Each of the waveguides 600a, 600b, 600c may include the features of the waveguide 200 described in connection with FIG. 2. The dichroic reflector 610 described in connection with FIG. 7 may be applied to the top of the first waveguide 600a. Spacers 700 may be applied to between adjacent waveguides. The gaps between adjacent waveguides may be filled with various materials such as air.

FIG. 9 illustrates an example of a waveguide-based display including three different waveguides in accordance with an embodiment of the invention. This configuration includes many of the same features as the device of FIG. 8. This description is applicable and therefore the description will not be repeated. A dichroic reflector 610b may be applied to the top of the second waveguide 600b and a dichroic reflector 610c the third waveguide 600c. The dichroic reflector 610a may as well as be on the top of the first waveguide 600a. In this configuration, the dichroic filter 610a, 610b, 610c may be tailored to the specific waveguide 600a, 600b, 600c.

FIG. 10 illustrates an example of a waveguide-based display including three different waveguides in accordance with an embodiment of the invention. This configuration includes many of the same features as described in connection with FIGS. 8 and 9. These descriptions are applicable and therefore these descriptions will not be repeated. The dichroic filter 610b of the second waveguide 600b has been removed. Instead, a dichroic filter 910 placed in a separate substrate 900 may be placed above the first waveguide 600a. The separate substrate 900 may be a protective layer. The dichroic filter 910 on the separate substrate 900 may correspond to the second waveguide 600b. For example, the second waveguide 600b may be a green waveguide and the dichroic reflector 910 may correspond to green and be applied to the protective layer 900.

Figure 11A:
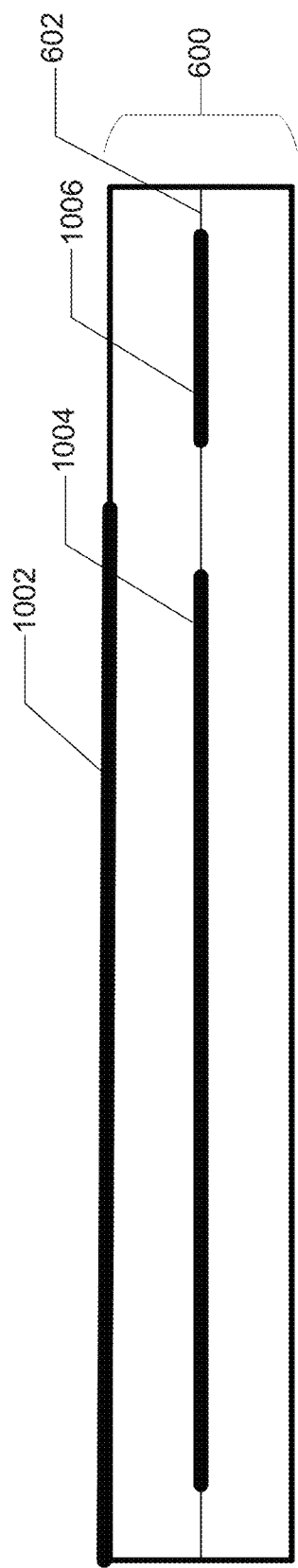
FIG. 11A illustrates a cross sectional view of a waveguide-based display including a dichroic filter in accordance with an embodiment of the invention.
Figure 11A:
Figure 11B:
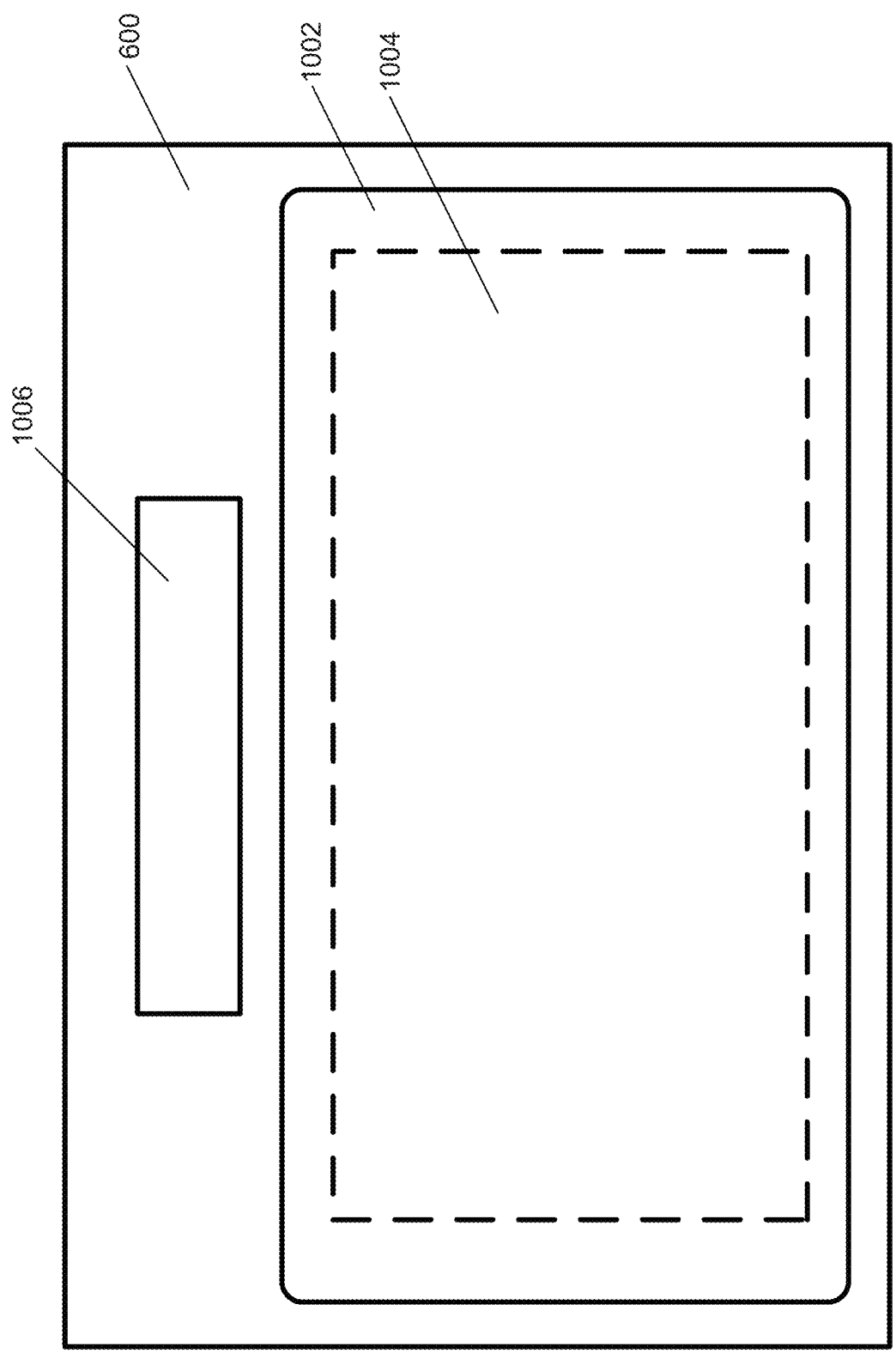
FIG. 11B is a schematic plan view of the waveguide-based display illustrated in FIG. 11A.

FIG. 11A illustrates a cross sectional view of a waveguide-based display including a dichroic filter in accordance with an embodiment of the invention. FIG. 11B illustrates a schematic plan view of the waveguide-based display of FIG. 11B. The waveguide 600 includes an incoupling optical element 1006 and an outcoupling optical element 1004. A dichroic filter 1004 overlaps the outcoupling optical element 1004. In some embodiments, the dichroic filter 1004 may not overlap the incoupling optical element 1006.

As can be readily appreciated, any number of dichroic reflectors (or reflection gratings/reflection waveguides) can be used as appropriate to the requirements of specific applications of embodiments of the invention. For example, only two dichroic reflectors might be used for a stack of three waveguides depending on the requirements of the design. Furthermore, it is understood that any mix of eye glow suppression structures can be used as appropriate to the requirements of specific applications of embodiments of the invention. Eye glow suppression structures do not necessarily need to reflect light. An alternative eye glow suppression structure is described below.

C. Absorbing and Transforming Layers

The eye glow suppression layer may include a light absorbing layer which may absorb light in a portion of the visible light spectrum. The light absorbing layer may be a narrowband dye absorber layer which may include a light absorbing dye suspended in a transparent matrix. Dye for absorption may be extremely narrow in wavelengths absorbed. Any unnecessary wavelengths absorbed will cause the waveguide to have a lower transmission, dimming the outside world and appearing dark. The location of the dye absorbing layer may vary. The dye absorber layer may be positioned on a protective cover if using multiple waveguides to guide one color FOV. If each waveguide is only guiding one color, then the dye can be applied to a protective cover on the front of the waveguide stack. Dyes may be angularly insensitive, covering a broad range of incident angles of eye-glow light. Exemplary dyes for the visible light region are manufactured by Yamada Chemical Co., Ltd (Japan). High absorption efficiency, narrow spectral absorption bandwidth and thermal stability may be important selection criteria. One possible approach for improving the absorber performance involves dilution of the dye in a transparent matrix, which can be an inert organic polymer compound or an inorganic compound. The resulting absorber can give narrow band absorption and high out of band transmittance. A multilayer configuration may allow absorption of more than one wavelength.

In some embodiments, the light absorbing layer may be a metamaterial absorbing layer. Metamaterial absorbers can be created with an extremely narrow spectral bandwidth. Absorption may be sensitive to angular deviations when it has such a narrowband absorption. The metamaterial absorbing layer may be placed on each waveguide individually if not sharing colors through multiple waveguides. The metamaterial absorbing layer may be placed on a protective cover above the top waveguide if sharing the colors in the waveguides.

Many of the eyeglow suppression solutions discussed may be implemented using metasurfaces which would include surfaces patterned with one or more types of nanostructures. Metasurfaces may be configured for light absorption, beam deflection and polarization as functions of one or both wavelength or angle. More than one of the above functions can be integrated into a single metasurface. Metasurfaces can offer complete or partial solutions to suppressing eye glow contributed by specular reflections from waveguides surface, eye surfaces and scattering surfaces.

The eye glow suppression structure may include wavelength altering elements such as quantum dots or phosphors. Quantum dots are nano-scale semiconductors that can absorb light of a first wavelength and emit light of a second wavelength. Quantum dots can be introduced into the substrate of a waveguide or applied to the loss side of a waveguide optic system to suppress eye glow rays. For example, quantum dots that absorb eye glow rays of a specific wavelength and emit light at a non-visible wavelength (e.g. infrared) can suppress eye glow rays from producing visible eye glow rays. The eye glow rays may still escape the waveguide however these eye glow rays may altered into the non-visible range. In many embodiments, the infrared and lower band is desirable due to the biologically harmful properties of ultraviolet light. However, depending on the use of the waveguide optic system, it may be acceptable to transform the light into the ultraviolet or higher band.

Depending on the quantum dots available, it may be difficult to shift higher frequency light (e.g. blue light) towards the infrared band. In this situation, series of different quantum dots can be used to shift the light wavelength in stages, and/or quantum dots can be incorporated into a waveguide optic system which also leverages one or more of the alternative eye glow suppression structures described herein. Depending on the number of wavelengths used in the waveguide optic system for display purposes, different sets of quantum dots can be applied to mitigate some or all of the different wavelengths.

As can be readily appreciated, quantum dots can be incorporated into a system that includes any or all of the above eye glow suppression structures. Indeed, while particular eye glow suppression structures are illustrated in the figures discussed above, any number of different architectures can be used which incorporate eye glow suppression structures as described herein.

D. Embodiments Including Synchronization

In many applications, it is desirable for the waveguide display to operate with a large eyebox. Although convenient for the viewer, this can produce a large amount of unused light impinging the user's face (e.g., light that does not reach the user's pupils). Depending on the implementation of the waveguide display, this unused light can be quite visible to an outside observer. As such, many embodiments of the invention are directed towards solutions for reducing the amount of unused light incident upon the user's face while preserving the operating size of the eyebox.

In many embodiments, the waveguide display includes at least one switchable Bragg grating (SBGs) for the control of out-coupled light to reduce the amount of unused light. Typically, eyebox size can be enlarged by multiplying or replicating in-coupled light through the use of diffractive gratings. If switchable Bragg gratings are implemented, the display can be configured to control the propagation of light such that only light that would reach the viewer's eye(s) is out-coupled, thereby reducing the amount of unused light ejected towards the user's face. In many embodiments, the required configuration for achieving such control is determined dynamically as the user's eyes are typically not static during operation. Accordingly, the configuration can also be implemented dynamically once determined.

In some embodiments, with a high brightness light source, a small duty cycle (~1%) can be used with the required output luminance. With this light source, an absorbing layer can be switched on and off, synchronized with the light source. This may absorb the eye-glow light while the source is on, but appear transparent to the observer averaged over many cycles. In some embodiments, the absorbing layer may be a switchable grating such as SBGs. The switchable grating may include a diffractive eye-glow element. This decreases the time of possible unwanted light being diffracted back toward the user through the diffractive element. The switchable gratings may be switchable output gratings. The switchable output gratings may be multiplexed grating schemes with a switching waveplate. For multiplexed gratings, the output light may be polarized after mixing from multiple gratings. If the gratings are switched in time, each grating may create a highly polarized output. In some embodiments, switching a waveplate synchronized with the switchable gratings may rotate the polarization of one or both outputs to be orthogonal with a linear polarizer at the output which may block the eye glow light. In some embodiments, switching a linear polarizer to be orthogonal with light output from the switchable grating may block the eye-glow light without having a permanent linear polarizer on the output. In some embodiments, switchable subwavelength gratings (based on the principle of form birefringence) may provide a wavelength specific optical retarder for synchronising eyeglow suppression with the light source. In some embodiments, the grating pitch may be much less than the wavelength of light. Thus, only the zero order and diffracted waves propagate and the higher diffracted orders may be evanescent.

Determining the required configuration to out-couple only light that will reach the user's eyes can be achieved in a variety of ways. In many embodiments, the waveguide display includes an eyetracker. The eyetracker can be implemented in many different ways. In some embodiments, a waveguide-based eyetracker is implemented to determine eye position and/or eye gaze information. Using information from the eyetracking sensor, the waveguide display can utilize a controller to implement a configuration of the states of the switchable Bragg grating to only out-couple light that would reach the user's eye. In some embodiments, the light that is outcoupled out of the waveguide otherwise would continue propagating through the waveguide to the edges. As can readily be appreciated, waveguide displays in accordance with various embodiments of the invention can be designed to mitigate unused light from escaping the edges of the waveguide. For example, the edges can be covered with a light absorbing material which may absorb any light that reaches the edges.

In implementing switchable Bragg gratings, the waveguide can include a transparent electrode such as an indium tin oxide (ITO) or index-matched ITO (IMITO) layer on either side as electrodes for switching the gratings between their ON/OFF states. In many embodiments, the waveguide includes a first ITO/IMITO layer on one side of grating layer and a second ITO/IMITO layer on the opposing side. The second layer can be patterned into selectively addressable elements. This allows for the switching of discrete areas of the switchable Bragg gratings. In some embodiments, the selectively addressable elements are large enough as to not introduce line/gap artifacts, which can result in noticeable scattering and/or diffractive effects. As can readily be appreciated, various transparent conductive oxide layers can also be utilized.

With the incorporation of these layers, absorptive losses by layers, that can be substantial, may be considered in the waveguide design. For example, some ITO layers can contribute ~0.25% of absorptive loss per pass. Depending on the waveguide architecture, the total propagation loss down the waveguide can be substantial. For example, controlling the amount of out-coupled light can include switching a portion of the output grating to its diffractive state. The switched portion can correspond to the viewer's eye position and/or eye gaze information. However, under such schemes, the distance in which the light propagates through the waveguide can vary, which when taken in consideration with the absorptive losses due to the ITO/IMITO layer(s) can result in varying losses in the out-coupled light. By modifying the output grating size and/or shape through the use of switching, the light propagation path can result in different amounts of TIR bounces within the waveguide (e.g., some configurations can result in longer light paths that interacts with the ITO/IMITO layer(s) a higher number of times). For light paths that interact with the ITO/IMITO more, the total losses in light intensity may be higher, resulting in non-uniformity across different configurations. As such, many embodiments are directed towards grating architectures and switching configurations designed to account for these differences. In many embodiments, the waveguide display may be configured to include an output grating having independently addressable sections capable of switching between diffractive and non-diffractive states. In some embodiments, the waveguide display can be configured to provide a scrolling output (e.g., the output image may be displayed in sections that are scrolled sequentially). In such cases, the output configuration for a certain eye position/eye gaze setting can be configured to have a uniform profile. In some embodiments, the switching can include a feathering effect with regards to switching timing to retain field uniformity.

E. Embodiments Including Anti-Reflection Coatings

Eye glow may be caused by several different effects. These effects may be split into collimated leakage and scattered leakage. Scattered leakage may be generated by hologram material, waveguide material, or holographic haze (haze recorded in the hologram). Scattered leakage may cause light to be scattered out of the waveguide towards the eye. Collimated leakage, e.g. light emerging eyeglow that preserves the angular image content coupled into the waveguide may be extracted with low diffraction efficiency. This may apply in particular to light that is off-Bragg. Such eyeglow may allow at least some of the displayed image to be viewed from the external world which may present privacy and data security issues. If a ghost grating occurs in the holographic recording process as a result of stray light or scattering centers resulting from incomplete phase separation, an apparent off Bragg interaction may arise from the ghost grating, which may manifest itself within a multiplexed grating.

This type of grating might be weakly recorded and might be difficult to separate from an off Bragg grating. The effect may be to collimate light diffracting out of the waveguide in the wrong direction. For Fresnel reflections, light diffracted from the grating plane towards the eye of the user may exit the waveguide. At the interface of the waveguide (on the eye side) and air, a Fresnel reflection may occur. Reflection from this interface will mostly exit from the waveguide on the user side. However, a small fraction of that light may in turn reflect back from the waveguide/air interface on the non-user side of the waveguide. Additionally, some light reinteracts with the grating following reflection from the waveguide/air eyeside reflection. In some embodiments, Fresnel reflections may be alleviated through an AR coating on the waveguide. Waveguides including higher index glass may have higher Fresnel reflections. AR coating therefore may reduce eye glow. Furthermore, the eye of the user can contribute reflected light which can take the form of scatter and specular reflections, most typically a mixture of the two. Contributions to the scatter or reflection from the user's eye may occur at any of the surfaces or optical media in the eye and can include Purkinje reflections. Scattered light from the hologram and waveguide material and from haze recorded into a hologram may have directional and isotropic characteristics determined by the nature of the scattering centres. Some of this light may go straight through the waveguide outer surface. Other exit paths may include a reflection at the eye of the user and surfaces of the waveguide near the user.

F. Embodiments Including Liquid Crystal Layers

In some embodiments, liquid crystal layers may be supported by the waveguide to decrease eye glow. The liquid crystal layers may be cholesteric liquid crystal layers. Liquid crystal layers may offer narrow band reflection gratings which may offer high diffraction efficiency. The liquid crystal layers may be inexpensive to manufacture. The liquid crystal layers may be configured in multilayer stacking to cover multiple waveband notches (e.g. R/G/B laser light sources). A chiral dopant may be added to the liquid crystal layers to control grating period.

In some embodiments, an eye glow control layer may be included on the waveguide. The eye glow control layer may include polymerizable liquid crystals called Liquid Crystal Polymers (LCPs), also known as reactive mesogens. LCPs may have all the usual properties of LC but can also be polymerized to form solid materials with LC alignment and birefringence properties existing in the liquid state being retained when the material is solidified in a polymer. UV alignment may be used to align the LC directors into desired directions while the LC is in its liquid state. LCPs can enable a range of optical functions such as selective colour reflectors, retardation (quarter wave, half wave etc.) and others. LCPs may contain liquid crystalline monomers that such as reactive acrylate end groups which polymerize with one another in the presence of photo-initiators and directional UV light to form a rigid 2D or 3D network. An LCP eyeglow control layer may be used in conjunction with other eye glow control layers as discussed throughout this disclosure. Exemplary LCP materials are developed by Merck KGaA (Germany). In some embodiments, the eye glow control layer may be based on tunable reflection filters using reflective cholesteric reactive mesogen nanopost structures. The reflection wavelength may be dependent on the pitch of the nanoposts, which can be fabricated using printing techniques. Nanoposts may be typically formed as arrays of features of height between 10 micron and 500 nm with pitch in the range of 1-10 micron.

G. Embodiments including Waveguide Output Polarization Designs

Output eye glow leakage may be strongly, but not perfectly polarized in waveguide solutions where the output grating may be represented with a single grating. In some embodiments, strongly polarized eye glow leakage may be minimized using a linear polarizer (e.g. analyzer) placed in front of the waveguide, but at the expense of see through transmission. Output gratings with cross multiplexed output gratings (e.g. Integrated Dual Axis-expansion IDA designs) may not have linear output polarization states: in such gratings the polarization matches the k-vectors of each of the constituent multiplexed (MUX) gratings. If MUX output gratings are at 90 degrees with respect to each other, then the output polarization may be mixed; a linear analyzer will then only serve to partially cut down the eye glow. In some embodiments, MUX output gratings minimize the k-vector components of each grating in one particular direction (e.g. minimize the vertical component of the k-vector) leaving only horizontal components in opposite directions. Even if the gratings were not completely aligned (in opposite directions) and were arranged such that one direction had stronger output polarization than the orthogonal direction, then use of a linear analyzer would still be beneficial. In some embodiments, where the MUX output structure k-vectors are largely in opposite directions, a linear analyzer may not completely block eye glow leakage, although an orientation can be found where the eye glow can be blocked by a factor greater than the loss factor in see through transmission by the linear analyzer. In some embodiments, the orientation of the eye glow polarization may be strongly aligned with the k-vector in anisotropic output gratings, and orthogonal to the k-vector in anisotropic gratings.

In some embodiments, a dimming layer may be applied to a top surface of the waveguide which may reduce eye glow. However, a dimming layer may also reduce optical see thru transmission as well. In some embodiments, the dimming layer may be a passive dimming layer or an active dimming layer. The active dimming layer may be an electro-chromic or photochromic dimming layer. In some embodiments, the active dimming layer may provide a temporal transmission variation matched to and synchronized to the luminance of the image content displayed by the projector (e.g. picture generation unit).

In some embodiments, microlouver films may be applied to a top surface of the waveguide which may reduce eye glow. The microlouver films may be used to suppress eye glow at extreme angles which may be at the limit of the effective angular bandwidth of many of the gratings and thin film coating solutions described throughout this disclosure. The microlouver film may be combined with a polarizer. Exemplary microlouver films are Light Control films manufactured by 3M Company (Minnesota).

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A waveguide display comprising:
a source of image modulated light;
a waveguide having an eye-facing surface and an external surface facing the outside world;
an input coupler for coupling the light into a total reflection internal path in the waveguide;
at least one grating for providing beam expansion and extracting light from the waveguide towards an eyebox;
a surface relief reflection grating comprising a modulation depth and a grating pitch, wherein the modulation depth is greater than the grating pitch across at least a portion of the polymer grating structure, wherein the surface relief reflection grating is positioned on the external surface of the waveguide,
wherein the surface relief reflection grating is configured to redirect stray light generated within the waveguide away from optical paths that are refracted through the external surface into the outside world and back out of the waveguide through the eye-facing surface,
wherein the surface relief reflection grating does not disturb the propagation of image modulated light within the waveguide and the extraction of the image modulated light towards the eyebox,
wherein the stray light generated within the waveguide comprises at least one selected from the group consisting of: light scattered from the grating material; zero order diffracted image modulated light; and image modulated light propagating along optical paths that are not extracted from the waveguide towards the eyebox.

2. The waveguide display of claim 1, wherein the surface relief reflection grating further comprises a backfill material between adjacent polymer regions, wherein the backfill material has a refractive index higher or lower than the refractive index of the polymer regions.

3. The waveguide display of claim 2, wherein the backfill material occupies a space at a bottom portion of the space between adjacent portions of the polymer grating structure and the air occupies the space from above the top surface of the backfill material to the modulation depth.

4. The waveguide display of claim 2, wherein the backfill comprises a birefringent material.

5. The waveguide display of claim 4, wherein the birefringent material comprises a liquid crystal material.

6. The waveguide display of claim 4, wherein the refractive index difference between the polymer regions and the birefringent material is 0.01 to 0.2.

7. The waveguide display of claim 1, wherein a modulation depth of the surface relief reflection grating is greater than a wavelength of visible light.

8. The waveguide display of claim 1, wherein the grating pitch is the spacing of diffractive features of the surface relief reflection grating and the modulation depth is the depth of the surface relief reflection grating.

9. The waveguide display of claim 1, wherein the surface relief reflection grating further comprises alternating polymer regions and air gap regions and the refractive index difference between the polymer regions and the air gap regions is in the range from 1.4 to 1.9.

10. The waveguide display of claim 1, wherein the surface relief reflection grating comprises:
polymer diffracting features; and
a birefringent material between adjacent polymer diffracting features, wherein the birefringent material has a higher or lower refractive index than the polymer diffracting features.

11. The waveguide display of claim 1, wherein the modulation depth of the surface relief reflection grating varies across the waveguide to provide a spatially varying polarization-dependent or angle-dependent diffraction efficiency characteristic.

12. The waveguide display of claim 1, wherein the surface relief reflection grating at least partially overlaps the input coupler and/or the at least one grating for providing beam expansion and extracting light from the waveguide.

13. The waveguide display of claim 1, the surface relief reflection grating comprises regions including a Bragg grating, a Raman-Nath grating, and no grating,
wherein the regions at least partially cover the input coupler and the at least one grating for providing beam expansion and extracting light.

14. The waveguide display of claim 13, further comprising a light control layer overlapping regions of the surface relief reflection grating containing no grating.

15. The waveguide display of claim 14, wherein the light control layer provides at least one selected from the group consisting of: polarization rotation, polarization-selective absorption, polarization-selective transmission, polarization-selective diffraction, angle-selective transmission, angle selective absorption, anti-reflectivity, and transmission within a defined spectral bandwidth.

16. The waveguide display of claim 1, wherein the surface relief reflection grating includes a rolled K-vector grating with slant angles varying continuously or in piecewise steps.

17. The waveguide display of claim 1, wherein the surface relief reflection grating includes a grating with spatially varying pitch.

18. The waveguide display of claim 1, wherein the surface relief reflection grating is a composite of at least one type of polymer and at least one other material.

19. The waveguide display of claim 18, wherein the at least one other material comprises nanoparticles.

20. The waveguide display of claim 1, wherein the surface relief reflection grating is coated with an optical material with an effective index up to 2.5.

21. The waveguide display of claim 1, wherein the surface relief reflection grating is coated with a first material and the coated grating is backfilled with a second material of refractive index higher or lower than the refractive index of the first material.

22. The waveguide display of claim 1, wherein the surface relief reflection grating comprises a first grating structure positioned on the external surface of the waveguide and a second grating structure positioned on the eye-facing surface of the waveguide.

23. The waveguide display of claim 22, wherein the first grating structure and the second grating structure have different grating periods.

* * * * *